US012610284B2

(12) United States Patent
Oyman et al.

(10) Patent No.: US 12,610,284 B2
(45) **Date of Patent: *Apr. 21, 2026**

(54) APPARATUS AND METHOD FOR SIGNALING RAN-ASSISTED CODEC ADAPTATION CAPABILITIES IN IMS MULTIMEDIA TELEPHONY SESSIONS

(71) Applicant: APPLE INC., Cupertino, CA (US)

(72) Inventors: Ozgur Oyman, Palo Alto, CA (US); Thomas Luetzenkirchen, Taufkirchen BY (DE); Sudhir Shankar Pola, Bangalore (IN); Usharani Ayyalasomayajula, Bangalore (IN)

(73) Assignee: Apple Inc., Cupertino, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 18/120,613

(22) Filed: Mar. 13, 2023

(65) Prior Publication Data

US 2023/0319643 A1     Oct. 5, 2023

Related U.S. Application Data

(63) Continuation of application No. 17/273,995, filed as application No. PCT/US2019/050189 on Sep. 9, 2019, now Pat. No. 11,611,909.
(Continued)

(51) Int. Cl.
*H04W 28/22*     (2009.01)
*H04L 65/65*     (2022.01)
*H04W 28/02*     (2009.01)

(52) U.S. Cl.
CPC ............. *H04W 28/22* (2013.01); *H04L 65/65* (2022.05); *H04W 28/0257* (2013.01)

(58) Field of Classification Search
None
See application file for complete search history.

(56) References Cited

U.S. PATENT DOCUMENTS 7,463,901 B2    12/2008  Svedberg et al.
10,771,509 B2    9/2020  Iyer et al.
(Continued)

FOREIGN PATENT DOCUMENTS

CN        105850067      8/2016
CN        107995688      5/2018
(Continued)

OTHER PUBLICATIONS

Rapporteur et al., "Summary for work item RAN-Assisted Codec Adaption in MTSI," 3GPP TSG SA Meeting #76, SP-170516, West Palm Beach, Florida, US, Jun. 7-9, 2017, 2 pages.
(Continued)

*Primary Examiner* — Lonnie V Sweet
(74) *Attorney, Agent, or Firm* — Fish & Richardson P.C.

(57) ABSTRACT

Provided herein are apparatus and method for signal RAN-assisted codec adaptation capabilities via IMS. An apparatus for a UE includes a RF interface to receive an SDP offer message from the remote UE, the SDP offer message including a first dedicated SDP attribute parameter to indicate support of ANBR capability of the remote UE; and processor circuitry. The processor circuitry is to decode the SDP offer message to determine the support of ANBR capability of the remote UE; encode an SDP answer message in response to the SDP offer message, the SDP answer message including a second dedicated SDP attribute parameter to indicate support of ANBR capability of the UE; and cause transmission of the SDP answer message to the remote UE. Other embodiments may also be disclosed and claimed.

17 Claims, 10 Drawing Sheets

300 receive SDP offer message including indication of support of ANBR capability from remote UE — 310 decode SDP offer message to obtain indication of support of ANBR capability of remote UE — 320 encode SDP answer message including indication of support of ANBR capability of local UE — 330 transmit SDP answer message to the remote UE — 340

Related U.S. Application Data

(60) Provisional application No. 62/728,625, filed on Sep. 7, 2018.

(56) References Cited

U.S. PATENT DOCUMENTS

| | | | | |
|---|---|---|---|---|
| 11,140,581 | B2 * | 10/2021 | Oyman | H04W 28/22 |
| 11,611,909 | B2 * | 3/2023 | Oyman | H04L 65/70 |
| 2005/0068936 | A1 * | 3/2005 | Keskiniva | H04L 12/64 |
| | | | | 370/352 |
| 2005/0088968 | A1 * | 4/2005 | Lauer | H04W 28/22 |
| | | | | 370/229 |
| 2006/0227728 | A1 * | 10/2006 | Baumann | H04L 65/65 |
| | | | | 370/352 |
| 2006/0239242 | A1 * | 10/2006 | Huffschmid | H04L 65/1043 |
| | | | | 370/352 |
| 2009/0054102 | A1 | 2/2009 | Jung | |
| 2010/0195521 | A1 * | 8/2010 | Wanstedt | H04W 8/04 |
| | | | | 370/252 |
| 2011/0141890 | A1 | 6/2011 | Giaretta et al. | |
| 2011/0219134 | A1 | 9/2011 | Lidstrom et al. | |
| 2012/0209952 | A1 | 8/2012 | Lotfallah et al. | |
| 2012/0218899 | A1 | 8/2012 | Ozawa | |
| 2013/0157674 | A1 | 6/2013 | Jylha-Ollila et al. | |
| 2013/0230057 | A1 | 9/2013 | Hori et al. | |
| 2013/0275615 | A1 | 10/2013 | Oyman | |
| 2014/0086123 | A1 | 3/2014 | Deivasigamani et al. | |
| 2014/0219088 | A1 * | 8/2014 | Oyman | H04N 21/4143 |
| | | | | 370/231 |
| 2014/0342739 | A1 | 11/2014 | Hori | |
| 2015/0201158 | A1 | 7/2015 | Yin | |
| 2016/0105468 | A1 * | 4/2016 | Mufti | H04L 65/80 |
| | | | | 709/228 |
| 2017/0187774 | A1 | 6/2017 | Qiu | |
| 2017/0330576 | A1 * | 11/2017 | Jung | G10L 19/24 |
| 2018/0013682 | A1 * | 1/2018 | Frankkila | H04L 47/25 |
| 2018/0027027 | A1 | 1/2018 | Leung et al. | |
| 2018/0041924 | A1 | 2/2018 | Hori et al. | |
| 2018/0102871 | A1 | 4/2018 | Wu | |
| 2018/0103389 | A1 | 4/2018 | Li et al. | |
| 2018/0176266 | A1 * | 6/2018 | Filart | H04L 65/80 |
| 2018/0183849 | A1 * | 6/2018 | Shin | H04L 65/65 |
| 2018/0324235 | A1 | 11/2018 | Mufti et al. | |
| 2018/0352092 | A1 | 12/2018 | Rajendran et al. | |
| 2019/0045578 | A1 * | 2/2019 | Oyman | H04L 65/1104 |
| 2019/0159071 | A1 | 5/2019 | Yavuz et al. | |
| 2019/0215729 | A1 * | 7/2019 | Oyman | H04L 65/1016 |
| 2019/0364465 | A1 | 11/2019 | Frankkila et al. | |
| 2020/0045587 | A1 | 2/2020 | Choi et al. | |
| 2020/0059818 | A1 | 2/2020 | Chang et al. | |
| 2021/0136619 | A1 * | 5/2021 | Iwai | H04L 47/805 |
| 2021/0360480 | A1 | 11/2021 | Oyman et al. | |
| 2022/0046478 | A1 * | 2/2022 | Oyman | H04W 28/22 |

FOREIGN PATENT DOCUMENTS

| | | |
|---|---|---|
| CN | 108353262 | 7/2018 |
| KR | 1020150120201 | 10/2015 |
| WO | WO 2015174018 | 11/2015 |
| WO | WO 2018085668 | 5/2018 |

OTHER PUBLICATIONS

[No Author Listed], "3rd Generation Partnership Project; Technical Specification Group Radio Access Network; NR; Physical layer; General description (Release 15)," 3GPP TS 38.201 V15.0.0, Dec. 2017, 12 pages.

3GPP, "3rd Generation Partnership Project; Technical Specification Group Services and System Aspects; Study on media handling aspects of conversational services in 5G systems (Release 16)," 3GPP TR 26.919 V2.0.0, Sep. 2018, 23 pages.

3GPP, "3rd Generation Partnership Project; Technical Specification Group Services and System Aspects; Study on media handling aspects of Radio Access Network (RAN) delay budget reporting in Multimedia Telephony Service for Internet Protocol (IP) Multimedia Subsystem (IMS) (MTSI) (Release 16)," TR 26.910 V2.0.0, Sep. 2018, 3GPP, 24 pages.

3GPP, "5G; NR; Medium Access Control (MAC) protocol specification (3GPP TS 38.321 version 15.2.0 Release 15)," ESTI, Sep. 2018, 74 pages.

3GPP, "IP Multimedia Subsystem (IMS); Multimedia Telephony; Media handling and interaction (Release 15)," 3GPP TS 26.114 V15.3.0, See section 10.7.3.3, Jun. 22, 2018, 399 pages.

3GPP, "LTE; Evolved Universal Terrestrial Radio Access (E-UTRA); Medium Access Control (MAC) protocol specification (3GPP TS 36.321 version 15.2.0 Release 15)," ETSI, Jul. 2018, 128 pages.

3GPP, "Study on media handling aspects of conversational services in 5G systems (Release 16)," 3GPP TR 26.919 V2.0.0, Aug. 30, 2018, See sections 5.3.3, 5.3.5, 5.5.6.1-5.5.6.2; and figure 5.5.6.1.1, ETSI, 24 pages.

3GPP, "Universal Mobile Telecommunications System (UMTS); LTE; IP Multimedia Subsystem (IMS); Multimedia telephony; Media handling and interaction (3GPP TS 26.114 version 15.3.0 Release 15)," ETSI, Jul. 2018, 405 pages.

PCT International Preliminary Report on Patentability in International Appln. No. PCT/US19/50189, dated Mar. 18, 2021, 7 pages.

PCT International Search Report and Written Opinion in International Appln. No. PCT/US19/50189, dated Dec. 26, 2019, 8 pages.

* cited by examiner

300 receive SDP offer message including indication of support of ANBR capability from remote UE ⟋ 310 decode SDP offer message to obtain indication of support of ANBR capability of remote UE ⟋ 320 encode SDP answer message including indication of support of ANBR capability of local UE ⟋ 330 transmit SDP answer message to the remote UE ⟋ 340

<u>400</u>

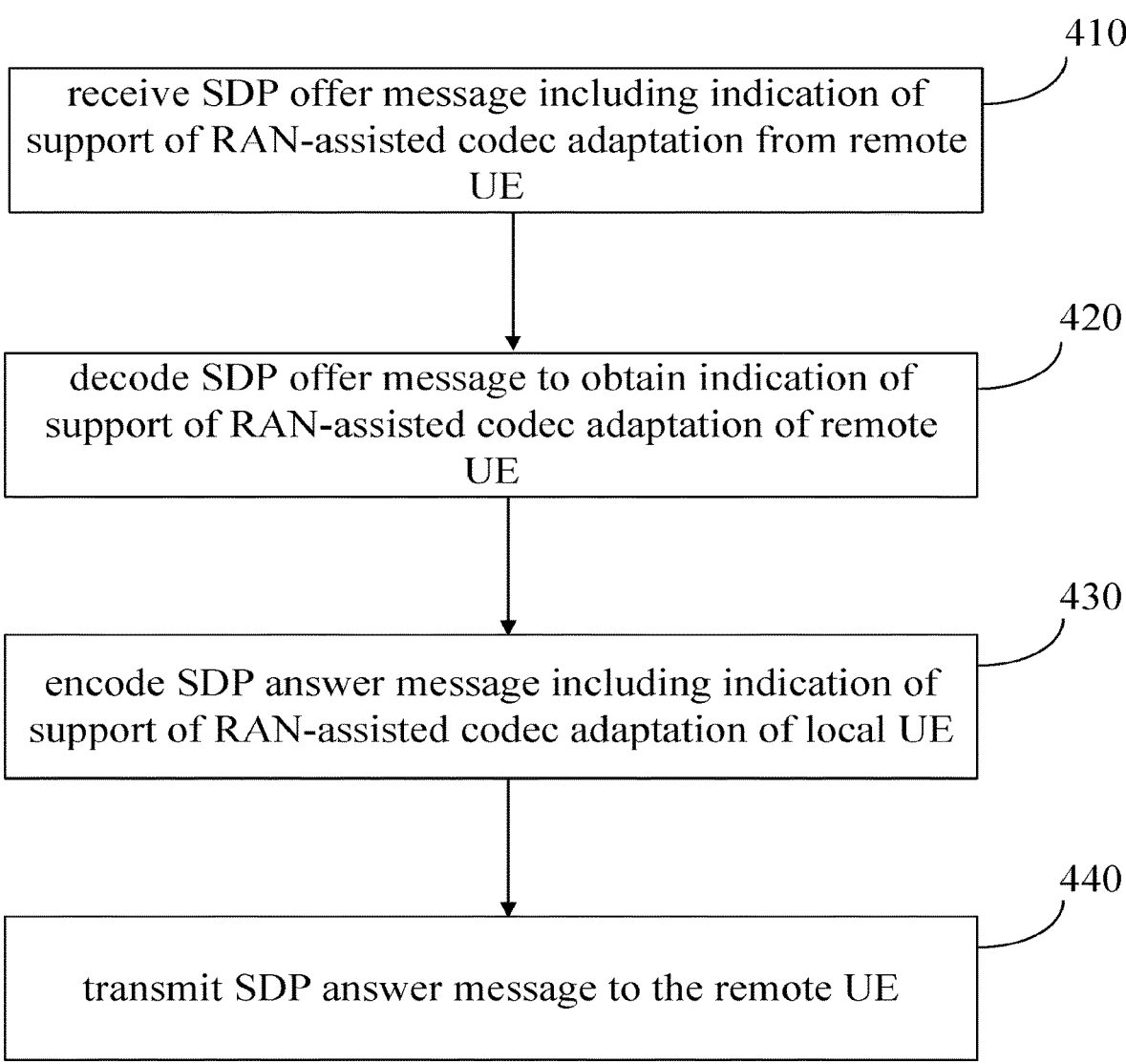

410 receive SDP offer message including indication of support of RAN-assisted codec adaptation from remote UE

420 decode SDP offer message to obtain indication of support of RAN-assisted codec adaptation of remote UE

430 encode SDP answer message including indication of support of RAN-assisted codec adaptation of local UE

440 transmit SDP answer message to the remote UE

FIG. 4

<u>500</u> encode SDP offer message including indication of support of RAN-assisted codec adaptation of local UE — 510 transmit SDP offer message to remote UE — 520 decode SDP answer message including indication of support of RAN-assisted codec adaptation of remote UE — 530

600

700

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  ID  | len=7 |q|p|               zero_padding                  |
+-+-+-+-+-+-+-+-+-+-+-+-+-+-+-+-+-+-+-+-+-+-+-+-+-+-+-+-+-+-+-+-+
```

FIG. 7

APPARATUS AND METHOD FOR SIGNALING RAN-ASSISTED CODEC ADAPTATION CAPABILITIES IN IMS MULTIMEDIA TELEPHONY SESSIONS

PRIORITY CLAIM

This application is based on and claims priority U.S. patent application Ser. No. 17/273,995, filed on Mar. 5, 2021, and claims priority under 35 U.S.C. 371 to International application No. PCT/US2019/050189 filled on 9 Sep. 2019, which claims priority to U.S. provisional application No. 62/728,625 filed on 7 Sep. 2018, both of which are incorporated herein by reference in their entirety.

TECHNICAL FIELD

Embodiments of the present disclosure generally relate to wireless communications, and in particular to an apparatus and a method for signaling RAN-assisted codec adaptation capabilities in IMS multimedia telephony sessions.

BACKGROUND ART

In an internet protocol (IP) multimedia subsystem (IMS) multimedia telephony session, e.g., a voice over long-term evolution (VoLTE) call, radio access network (RAN)-assisted codec adaptation can be enabled to improve end-to-end quality. The codec adaptation may be triggered by access network bitrate recommendation (ANBR) information received from the RAN. This disclosure will provide solutions for support for radio capability on ANBR signaling and signaling of RAN-assisted codec adaptation capabilities in IMS multimedia telephony sessions, and other related solutions.

SUMMARY

An aspect of the disclosure provides an apparatus for a user equipment (UE) operable to stream media of a multimedia telephony session with a remote UE, the apparatus comprising: a radio frequency (RF) interface to receive a session description protocol (SDP) offer message from the remote UE, wherein the SDP offer message includes a first dedicated SDP attribute parameter to indicate support of access network bitrate recommendation (ANBR) capability of the remote UE, and wherein the ANBR capability of the remote UE corresponds to an ability to receive ANBR information from a remote radio access network (RAN) to which the remote UE is connected or an ability of the remote RAN to transmit the ANBR information; and processor circuitry coupled with the RF interface, wherein the processor circuitry is to: decode the SDP offer message received from the RF interface to obtain the first dedicated SDP attribute parameter to determine the support of ANBR capability of the remote UE; encode an SDP answer message in response to the SDP offer message, wherein the SDP answer message includes a second dedicated SDP attribute parameter to indicate support of ANBR capability of the UE, and wherein the ANBR capability of the UE corresponds to an ability to receive ANBR information from a RAN to which the UE is connected or an ability of the RAN to transmit the ANBR information; and cause transmission of the SDP answer message to the remote UE.

An aspect of the disclosure provides one or more computer-readable media having instructions stored thereon, the instructions when executed by processor circuitry of a UE cause the processor circuitry to: decode an SDP offer message received from a remote UE with which the UE is operable to stream media of a multimedia telephony session, wherein the SDP offer message includes a first dedicated SDP attribute parameter to indicate support of ANBR capability of the remote UE and support of RAN-assisted codec adaptation of the remote UE; encode an SDP answer message in response to the SDP offer message, wherein the SDP answer message includes a second dedicated SDP attribute parameter to indicate support of ANBR capability of the UE and support of RAN-assisted codec adaptation of the UE; and cause transmission of the SDP answer message to the remote UE, wherein the ANBR capability of the remote UE corresponds to an ability to receive ANBR information from a remote RAN to which the remote UE is connected or an ability of the remote RAN to transmit the ANBR information, and the ANBR capability of the UE corresponds to an ability to receive ANBR information from a RAN to which the UE is connected or an ability of the RAN to transmit the ANBR information.

An aspect of the disclosure provides an apparatus for a UE operable to stream media of a multimedia telephony session with a remote UE, the apparatus comprising: a RF interface to receive an SDP offer message from the remote UE, wherein the SDP offer message includes a first dedicated SDP attribute parameter to indicate support of RAN-assisted codec adaptation of the remote UE; and processor circuitry coupled with the RF interface, wherein the processor circuitry is to: decode the SDP offer message received from the RF interface; encode an SDP answer message in response to the SDP offer message, wherein the SDP answer message includes a second dedicated SDP attribute parameter to indicate support of RAN-assisted codec adaptation of the UE; and cause transmission of the SDP answer message to the remote UE.

BRIEF DESCRIPTION OF THE DRAWINGS

Embodiments of the disclosure will be illustrated, by way of example and not limitation, in the figures of the accompanying drawings in which like reference numerals refer to similar elements.

FIG. 4 illustrates a flowchart of a method for ANBR-triggered adaptation by a sending UE in accordance with some other embodiments of the disclosure.

FIG. 7 illustrates a schematic diagram showing an example of RTP header extension message format in accordance with some embodiments of the disclosure.

DETAILED DESCRIPTION OF EMBODIMENTS

Figure 1:
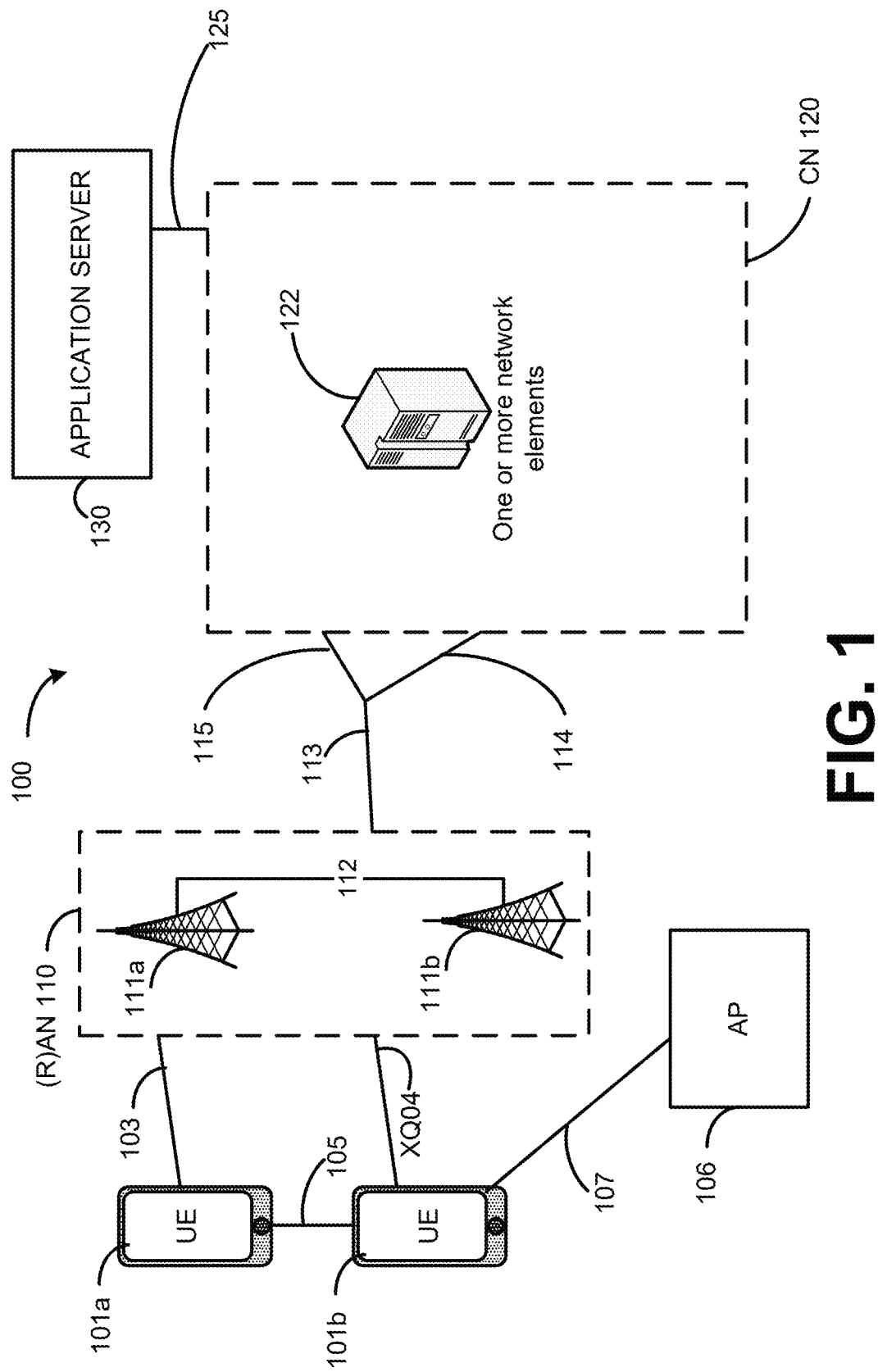
FIG. 1 illustrates an example architecture of a system in accordance with some embodiments of the disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)".

Radio access network (RAN)-assisted codec adaptation and associated signaling of access network bitrate recommendation (ANBR) information from the RAN to a user equipment (UE) have been defined for long term evolution (LTE) and new radio (NR) access respectively in the 3rd generation partnership project (3GPP) technical specification (TS) 36.321 V15.2.0 (2018-07) and 3GPP TS 38.321 V15.2.0 (2018 June). RAN-assisted codec adaptation (also referred to as RAN support for ANBR) has been specified for both LTE and NR access as an optional feature.

Moreover, from a media handling point of view, the support for ANBR as an adaptation trigger has also been left optional for speech, and recommended for video in 3GPP TS 26.114 V15.3.0 (2018 June) (particularly in clause 10.7). In the meantime, ANBR-triggered adaptation needs to be used in an end-to-end fashion, as described by the workflows in clause 10.7.3 of the 3GPP TS 26.114 V15.3.0. However, no signaling is currently present to provide end-to-end coordination between the UEs in regard to ANBR capability or ANBR-triggered adaptation capability.

In regard to support for radio capabilities on ANBR signaling, an SDP-based capability indication method has been described in clause 5.5.5 of 3GPP technical report (TR) 26.919 V2.0.0 (2018 August), that allows to indicate that ANBR signaling is supported over a given access network, i.e., LTE or NR access. For example, in case of LTE access, a UE that supports ANBR reception over the LTE air interface checks with its evolved NodeB (eNB) on whether it also supports ANBR signaling, and if so, it includes a session description protocol (SDP) attribute anbr_e2e in its SDP offer or answer, as described in the 3GPP TR 26.919

V2.0.0. However, access specific nature of this SDP-based capability indication requires SDP renegotiation every time the UE changes access, e.g., handover from NR to LTE. Such frequent SDP renegotiations are costly and not desirable from core network perspective.

This disclosure enables SDP and real-time transport protocol (RTP)/real-time transport control protocol (RTCP)-based methods to signal ANBR capability information and specific RAN-assisted codec adaptation capabilities to improve end-to-end quality of VoLTE calls. Signaled RAN-assisted codec adaptation capabilities may include various client rate adaptation behaviors triggered by the ANBR information received from the access network, including changing a sent bitrate as well as transmissions of codec mode request (CMR)/RTCP-application (RTCP-APP) messages for speech rate adaptation and temporary maximum media stream bitrate request (TMMBR)/temporary maximum media stream bitrate notification (TMMBN) messages for video rate adaptation. Furthermore, signaled RAN-assisted codec adaptation capabilities can also include support for radio capabilities on ANBR signaling over the given access network.

FIG. 1 illustrates an example architecture of a system 100 in accordance with some embodiments of the disclosure. The following description is provided for an example system 100 that operates in conjunction with the Long Term Evolution (LTE) system standards and the 5G or New Radio (NR) system standards as provided by 3GPP technical specifications (TS). However, the example embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 1, the system 100 may include UE 101*a* and UE 101*b* (collectively referred to as "UEs 101" or "UE 101"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart"

appliances, machine-type communications (MTC) devices, machine-to-machine (M2M), Internet of Things (IoT) devices, and/or the like.

In some embodiments, any of the UEs 101 can comprise an IoT UE, which may comprise a network access layer designed for low-power IoT applications utilizing short-lived UE connections. An IoT UE can utilize technologies such as M2M or MTC for exchanging data with an MTC server or device via a PLMN, Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an access network (AN) or a radio access network (RAN) 110. In embodiments, the RAN 110 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer. As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 101b is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 101b in RRC_CONNECTED being configured by a RAN node 111 to utilize radio resources of LTE and WLAN. LWIP operation may involve the UE 101b using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "AN node", "RAN node", "access node", "access point" or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

Although RAN nodes 111a and 111b are shown in the same RAN 110 in FIG. 1, they can be in different RANs in some embodiments. In addition, RAN nodes 111a and 111b may be different kinds of nodes. For example, RAN node 111a may be an eNB, and RAN node 111b may be a gNB. The disclosure is not limited in these respect.

In some embodiments, all or parts of the RAN nodes 111 may be implemented as one or more software entities running on server computers as part of a virtual network, which may be referred to as a cloud radio access network (CRAN) and/or a virtual baseband unit pool (vBBUP). In these embodiments, the CRAN or vBBUP may implement a RAN function split, such as a PDCP split wherein RRC and PDCP layers are operated by the CRAN/vBBUP and other Layer 2 (L2) protocol entities are operated by individual RAN nodes 111; a MAC/PHY split wherein RRC, PDCP, RLC, and MAC layers are operated by the CRAN/vBBUP and the PHY layer is operated by individual RAN nodes 111;

or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or radio front end modules (RFEMs) (not shown), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations towards the UEs 101, and are connected to a 5GC via an NG interface (not shown).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU", an RSU implemented in or by an eNB may be referred to as an "eNB-type RSU," an RSU implemented in or by an gNB may be referred to as an "gNB-type RSU," and the like. In one example, an RSU is a computing device coupled with radiofrequency circuitry located on a roadside that provides connectivity support to passing vehicle UEs 101 (vUEs 101). The RSU may also include internal data storage circuitry to store intersection map geometry, traffic statistics, media, as well as applications/software to sense and control on-going vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a WiFi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired (e.g., Ethernet) connection to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111, 112 communicate (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111, 112 may operate using Licensed Assisted Access (LAA), enhanced LAA (eLAA), and/or further eLAA (feLAA) mechanisms. In these implementations, the UEs 101 and the RAN nodes 111, 112 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101, RAN nodes 111, 112, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. Tn some implementations, the LBT procedure for DL or UL transmission bursts including PUSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (μs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs 101. The physical downlink control channel (PDCCH) may carry information about the transport format and resource allocations related to the PDSCH channel, among other things. It may also inform the UEs 101 about the transport format, resource allocation, and H-ARQ (Hybrid Automatic Repeat Request) information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, Core Network (CN) 120. The CN 120 may comprise a plurality of network elements 122, which are configured to offer various data and telecommunications services to customers/subscribers (e.g., users of UEs 101) who are connected to the CN 120 via the RAN 110. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS Packet Services (PS) domain, LTE PS data services, etc.). The application server 130 can also be configured to support one or more communication services (e.g., Voice-over-Internet Protocol (VoIP) sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a user plane function (UPF), and the S1 control plane (NG-C) interface 115, which is a signaling interface between the RAN nodes 111 and AMFs.

In embodiments, the CN 120 may be a 5G CN (referred to as "5GC 120" or the like), while in other embodiments, the CN 120 may be an Evolved Packet Core (EPC)). Where CN 120 is an EPC (referred to as "EPC 120" or the like), the RAN 110 may be connected with the CN 120 via an S1 interface 113. In embodiments, the S1 interface 13 may be split into two parts, an S1 user plane (S1-U) interface 114, which carries traffic data between the RAN nodes 111 and the serving gateway (S-GW), and the S1-mobility management entity (MME) interface 115, which is a signaling interface between the RAN nodes 111 and MMEs.

Figure 2:
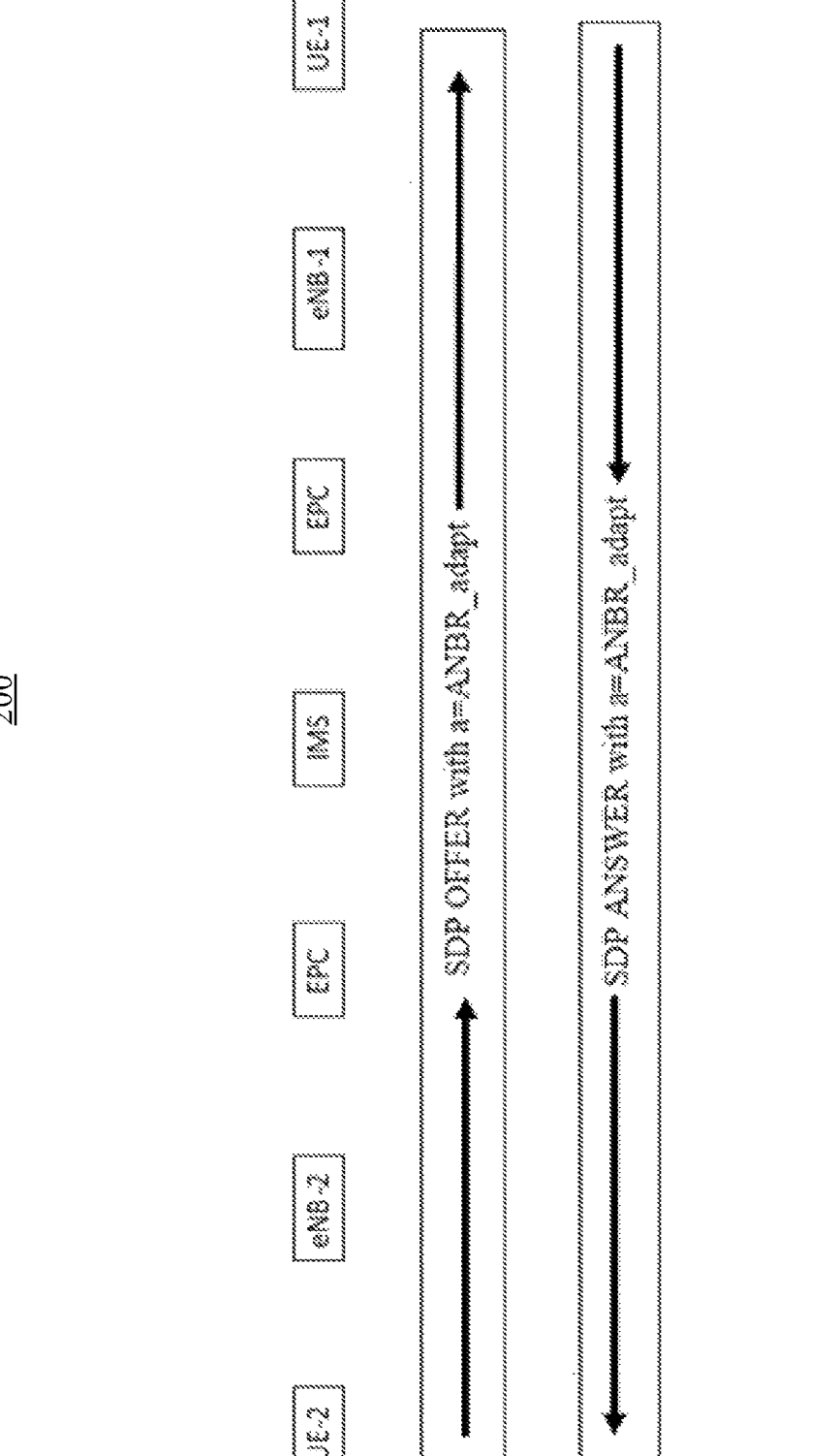
FIG. 2 illustrates a schematic diagram showing an example of SDP offer-answer with an SDP attribute parameter in accordance with some embodiments of the disclosure.

FIG. 2 illustrates a schematic diagram showing an example of SDP offer-answer 200 with an SDP attribute parameter in accordance with some embodiments of the disclosure.

As shown in FIG. 2, two UEs (UE-1 and UE-2) are connected to two eNBs (eNB-1 and eNB-2) respectively. The two eNBs are connected to the EPC. The UEs may communicate with each other in a IMS multimedia telephony session through the IMS via the EPC.

In the embodiment of FIG. 2, eNB of LTE access is used for example. However, other RAN node, e.g., gNB of NR access, can also be used, which is not limited in the disclosure.

In the example of FIG. 2, the UE-2 may transmit an SDP offer message including a dedicated SDP attribute parameter to the UE-1, and in response, the UE-1 may transmit an SDP answer message including a dedicated SDP attribute parameter to the UE-2. In other examples, the UE-1 may transmit an SDP offer message to the UE-2, and in response, the UE-2 may transmit an SDP answer message to the UE-1. The disclosure is not limited in this respect.

Figure 3:
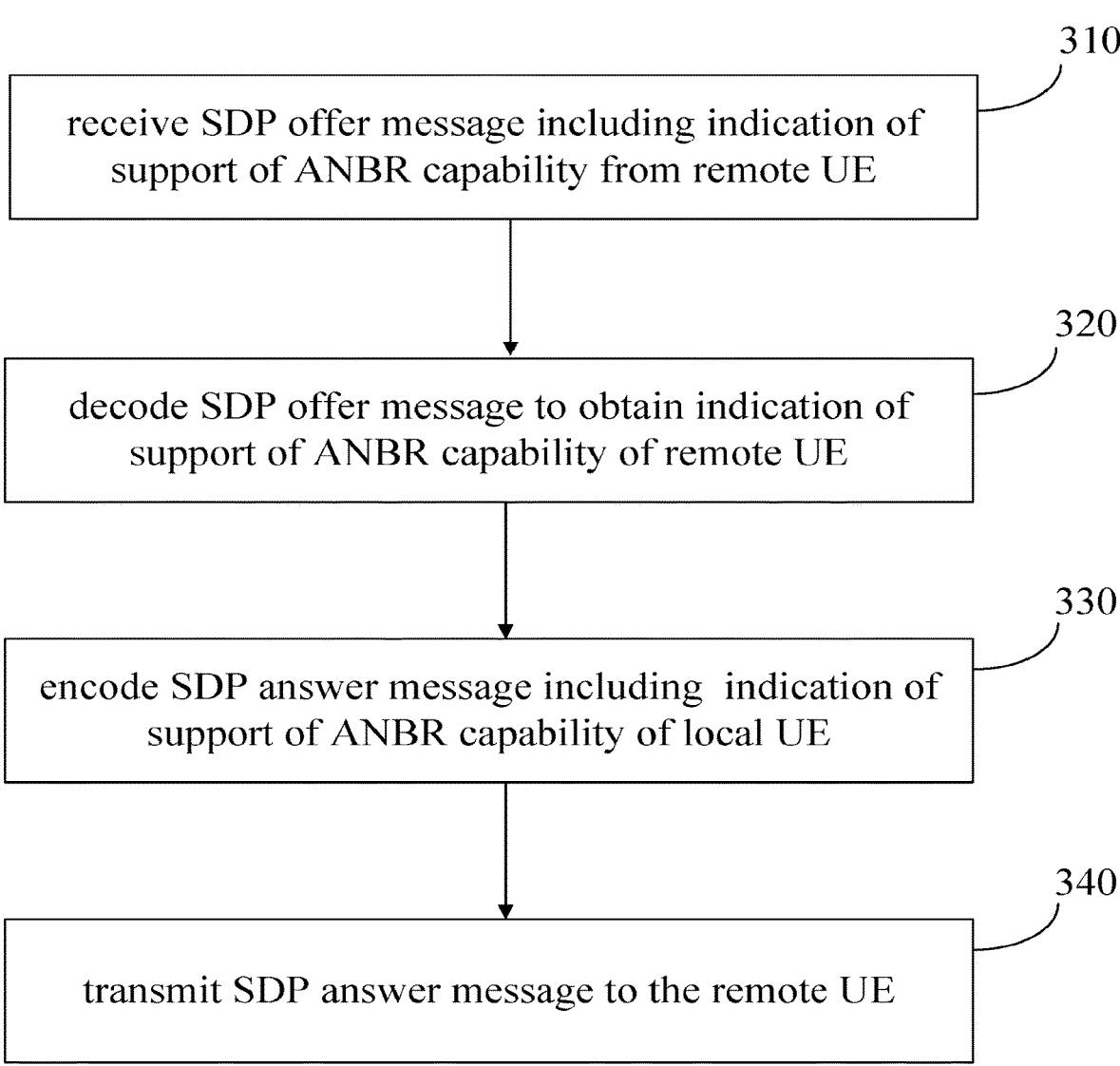
FIG. 3 illustrates a flowchart of a method for indication of support of ANBR capability based on SDP in accordance with some embodiments of the disclosure.

FIG. 3 illustrates a flowchart of a method 300 for indication of support of ANBR capability based on SDP in accordance with some embodiments of the disclosure.

At 310, a UE (e.g., the UE(s) 101 of FIG. 1 or UE-1 of FIG. 2) may receive an SDP offer message from a remote UE (e.g., the UE(s) 101 of FIG. 1 or UE-2 of FIG. 2). In this embodiment, the UE-1 of FIG. 2 is described as a local UE, and the UE-2 of FIG. 2 is described as a remote UE with respect to the UE-1, for example.

The SDP offer message may include a dedicated SDP attribute parameter to indicate support of ANBR capability of the remote UE-2. The ANBR capability of the remote UE-2 may correspond to an ability to receive/or query ANBR information from its RAN (e.g., eNB-2 of FIG. 2) and/or an ability of the eNB-2 to transmit the ANBR information.

At 320, the UE-1 may decode the SDP offer message received from the remote UE-2 to obtain support of the ANBR capability of the remote UE-2.

At 330, the UE-1 may, in response to the SDP offer message, encode an SDP answer message including the dedicated SDP attribute parameter to indicate support of ANBR capability of the UE-1. The ANBR capability of the UE-1 may correspond to an ability to receive/query ANBR information from its RAN (e.g., eNB-1 of FIG. 2) and/or an ability of the eNB-1 to transmit the ANBR information.

At 340, the UE-1 may transmit the SDP answer message to the remote UE-2, and then the remote UE-2 may know support of the ANBR capability of the UE-1.

In an embodiment, the dedicated SDP attribute parameter may be a media-level SDP attribute parameter and may be identified as "ANBR_adapt". In an example, "a=ANBR_adapt" may be used to indicate that associated UE supports ANBR capability. As shown in FIG. 2, the SDP offer message with a=ANBR_adapt and the SDP answer message with a=ANBR_adapt may be used to indicate support of ANBR capability of the UEs. However, other SDP parameter may be used to indicate the support of ANBR capability, and the disclosure is not limited in this respect.

In an embodiment, alternatively or additionally, the dedicated SDP attribute parameter of the UE-1 may indicate support of RAN-assisted codec adaptation of the UE-1, and the dedicated SDP attribute parameter of the UE-2 may indicate support of RAN-assisted codec adaptation of the UE-2. The RAN-assisted codec adaptation of the UE-1 is performed by the UE-1 based on the ANBR information received from the eNB-1, and the RAN-assisted codec adaptation of the UE-2 is performed by the UE-2 based on the ANBR information received from the eNB-2, for example.

Signalling of ANBR capabilities in the SDP messages via a dedicated SDP attribute parameter, e.g., "a=ANBR_adapt", may enable multimedia telephony service for IMS (MTSI) client (application or media rate adaptation engine) of a UE to realize that ANBR capability and/or RAN-assisted codec adaptation is supported and ANBR signaling from its RAN will not be ignored, and thus enable end-to-end coordination of ANBR capabilities across the UEs or access networks.

Below, RAN-assisted codec adaptation based on ANBR information will be detailed in conjunction with FIG. 4, FIG. 5 and FIG. 2.

FIG. 4 illustrates a flowchart of a method 400 for ANBR-triggered adaptation by a sending UE in accordance with some other embodiments of the disclosure. FIG. 5 illustrates a flowchart of a method 500 for ANBR-triggered adaptation by a receiving UE in accordance with some other embodiments of the disclosure. In this embodiment, the UE-1 of FIG. 2 is described as a local UE, and the UE-2 of FIG. 2 is described as a remote UE with respect to UE-1, for example.

FIG. 4 illustrates the method for ANBR-triggered adaptation from the perspective of a sending bitrate of a sending UE.

At 410, UE-1 may receive an SDP offer message from the remote UE-2. The SDP offer message may include a dedicated SDP attribute parameter to indicate support of RAN-assisted codec adaptation of the remote UE-2. The support of RAN-assisted codec adaptation of the remote UE-2 may enable the remote UE-2 to adapt its codec rate based on ANBR information received from its RAN (e.g., eNB-2 of FIG. 2). Herein, the codec rate may include sending rate in uplink direction and receiving rate in downlink direction. Accordingly, the ANBR information may include uplink ANBR information and downlink ANBR information.

At 420, the UE-1 may decode the SDP offer message received from the remote UE-2 to obtain support of the RAN-assisted codec adaptation of the remote UE-2.

At 430, the UE-1 may encode, in response to the SDP offer message, an SDP answer message including the dedicated SDP attribute parameter to indicate support of RAN-assisted codec adaptation of the UE-1. The support of RAN-assisted codec adaptation of the UE-1 may enable the UE-1 to adapt its codec rate based on ANBR information received from its RAN (e.g., eNB-1 of FIG. 2).

At 440, the UE-1 may transmit the SDP answer message to the remote UE-2, and then the remote UE-2 may know support of the RAN-assisted codec adaptation of the UE-1.

Figure 5:
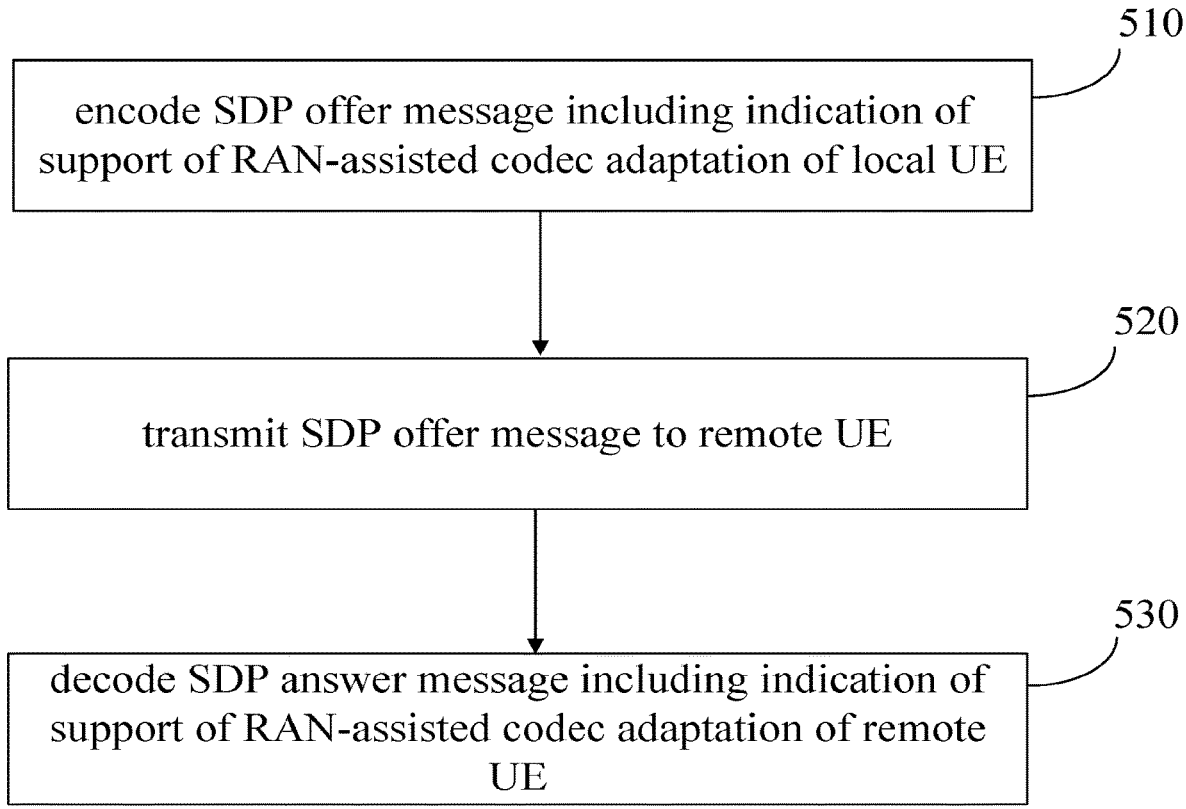
FIG. 5 illustrates a flowchart of a method for ANBR-triggered adaptation by a receiving UE in accordance with some other embodiments of the disclosure.

Correspondingly, FIG. 5 illustrates the method for ANBR-triggered adaptation from the perspective of a receiving bitrate of a receiving UE. In this embodiment, the UE-2 of FIG. 2 is described as a local UE, and the UE-1 of FIG. 2 is described as a remote UE with respect to UE-2, for example.

At 510, the UE-2 may encode an SDP offer message including a dedicated SDP attribute parameter to indicate support of RAN-assisted codec adaptation of the UE-2. At 520, the UE-2 may transmit the SDP offer message to the remote UE-1. At 530, the UE-2 may decode an SDP answer message transmitted from the remote UE-1 in response to the SDP offer message. The SDP answer message may include the dedicated SDP attribute parameter to indicate support of RAN-assisted codec adaptation of the remote UE-1.

Embodiments related to behaviors of RAN-assisted codec adaptation will be described in detail. In these embodiments, the UE-1 and the UE-2 may communicate media via a multimedia telephony session. The UE-1 may be operated as a sending UE (e.g., MTSI sender) and the UE-2 may be operated as a receiving UE (e.g., MTSI receiver), for example. It should be noted that in other embodiments the UE-1 may be operated as a receiving UE and the UE-2 may be operated as a sending UE, which is not limited in this respect. Moreover, the SDP offer message can be transmitted not only the receiving UE, but also the sending UE, and similarly, the SDP answer message can be transmitted not only the sending UE, but also the receiving UE, which is not limited in this respect.

In an embodiment, as the sending UE, the UE-1 may perform RAN-assisted codec adaptation based on uplink ANBR information received from the eNB-1. In particular, the UE-1 may be configured to adjust the sending bitrate for transmission of the media of the multimedia telephony session based on the uplink ANBR information received from the eNB-1.

In an embodiment, the UE-1 may decrease the sending bitrate to a bitrate value indicated by the uplink ANBR information when the bitrate value is smaller than the sending bitrate.

In another embodiment, the UE-1 may increase the sending bitrate to the smallest one among a bitrate value indicated by the uplink ANBR information and a bitrate value restricted by each of other bitrate adaptation triggers for the UE-1, when the bitrate value indicated by the uplink ANBR information is greater than the sending bitrate. The other bitrate adaptation triggers may include, but not limited to, explicit congestion notification (ECN) triggered rate adaptation for audio and video, CMR triggered rate adaptation for audio, RTCP-APP triggered rate adaptation for audio, and TMMBR and TMMBN triggered rate adaptation for video. In other words, in an embodiment where the bitrate value indicated by the uplink ANBR information is greater than the sending bitrate, the sending bitrate of the UE-1 may be determined based on the smallest one of all bitrate adaptation triggers of the UE-1 including that indicated in the uplink ANBR information.

In an embodiment where the bitrate value indicated by the uplink ANBR information is greater than the sending bitrate, the UE-1 may, alternatively or additionally, adjust the sending bitrate at least based on the downlink ANBR information for the remote UE-2. In other words, before increasing the sending bitrate, the UE-1 may send a RTCP-TMMBN message to the receiving UE (i.e., UE-2) based on the smallest one among the bitrate value indicated by the uplink ANBR information and the bitrate value restricted by each of other bitrate adaptation triggers for the UE-1. Then the UE-2 may send an ANBR query to the eNB-2 and obtain the latest ANBR information for the UE-2, to check whether the bitrate value indicated in the TMMBN message can be supported. If UE-2 receives a lower ANBR value from the eNB-2, then the UE-2 would send a TMMBR message to the UE-1 with the lower ANBR value indicated by the eNB-2. In response, the UE-1 may adjust its sending bitrate based on the lower ANBR value, for example, the UE-1 may adjust its sending bitrate to the lower ANBR value indicated by the eNB-2.

The above embodiments may be applied to various media types including, but not limited to, speech and video.

In embodiments for the receiving UE-2, speech and video will be described separately as different messages are involved.

In embodiments where speech is communicated between the UE-1 and the UE-2, as the receiving UE, the UE-2 may, based on the downlink ANBR information received from the eNB-2, encode a CMR/RTCP-APP message, for transmission to the UE-1. The CMR/RTCP-APP message is to indicate a desired receiving bitrate of the UE-2 for reception of the speech.

In an embodiment, the desired receiving bitrate may be determined to be a bitrate value indicated by the downlink ANBR information, when the bitrate value indicated by the downlink ANBR information is smaller than a receiving bitrate for reception of the speech.

In another embodiment, the desired receiving bitrate may be determined to be the smallest one among a bitrate value indicated by the downlink ANBR information and a bitrate value restricted by each of other bitrate adaptation triggers for the UE-2, when the bitrate value indicated by the downlink ANBR information is greater than a receiving bitrate for reception of the speech. In other words, in an embodiment where the bitrate value indicated by the downlink ANBR information is greater than the receiving bitrate, the receiving bitrate of the UE-2 may be determined based on the smallest one of all bitrate adaptation triggers of the UE-2 including that indicated in the downlink ANBR information.

In embodiments where video is communicated between the UE-1 and the UE-2, as the receiving UE, the UE-2 may, based on the downlink ANBR information received from the eNB-2, encode a RTCP TMMBR message, for transmission to the UE-1. The RTCP TMMBR message is to indicate a desired receiving bitrate for reception of the video.

Similarly, in an embodiment, the desired receiving bitrate may be determined to be a bitrate value indicated by the downlink ANBR information, when the bitrate value indicated by the downlink ANBR information is smaller than a receiving bitrate for reception of the video.

In another embodiment, the desired receiving bitrate may be determined to be the smallest one among a bitrate value indicated by the downlink ANBR information and a bitrate value restricted by each of other bitrate adaptation triggers for the UE-2, when the bitrate value indicated by the downlink ANBR information is greater than a receiving bitrate for reception of the video.

Additional codec adaptation behaviors described in clause 10.7.3 of 3GPP TS 26.114 V15.3.0 may also be included herein based on the above newly defined dedicated SDP attribute parameter.

Some embodiments related to indication of support of ANBR capability and indication of support of RAN-assisted codec adaptation are described above. These embodiments are related to indication based on SDP. Some other embodiments will be described below to discuss indication of support of ANBR capability based on RTP/RTCP.

Figure 6:
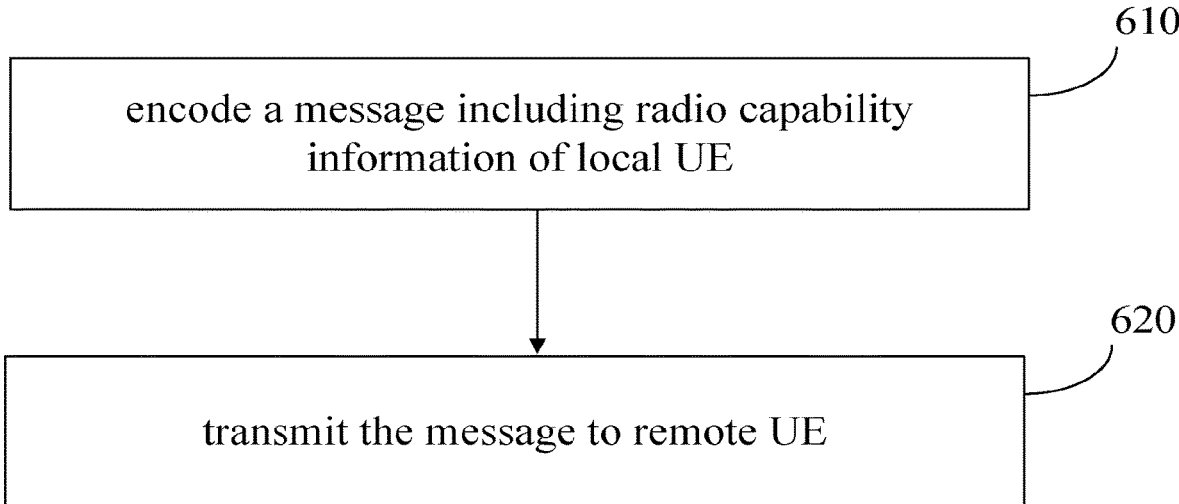
FIG. 6 illustrates a flowchart of a method for indication of support of ANBR capability based on RTP/RTCP in accordance with some embodiments of the disclosure.

FIG. 6 illustrates a flowchart of a method 600 for indication of support of ANBR capability based on RTP/RTCP in accordance with some embodiments of the disclosure.

At 610, the UE may encode a message including radio capability information of the UE. At 620, the UE may transmit the message to a remote UE.

As mentioned above, the message may include an SDP message during a IMS/session initiation protocol (SIP) based capability negotiation, which is omitted here for conciseness.

In an embodiment, a UE may include the above mentioned SDP attribute parameter in the SDP offer/answer only if it supports the corresponding radio capabilities over the given access network, e.g., in case of ANBR, only if the UE supports ANBR information reception from its access network. Then, once the session, associated bearers, and logical channels are established, the UE would also learn whether its access network (e.g., eNB in case of LTE access and gNB in case of NR access) is able to send ANBR information to the UE. Based on this knowledge, the UE may inform the remote UE on the radio capability information (e.g., support of ANBR capability) using the above mentioned SDP signaling methods. Alternatively, the UE may inform the remote UE on the radio capability information using the RTP/RTCP signaling messages below.

In an embodiment, the message carrying the radio capability information may include an application layer message. In an embodiment, the application layer message may include a RTCP feedback (RTCP FB) message as specified in internet engineering task force (TETF) request for comments (RFC) 4585 (2006.7), or a RTP header extension message. Both of the RTCP-FB message and the RTP header extension message are configured to carry radio capability information for the current access network to which the UE is connected during the RTP streaming of media. However, they describe radio capabilities on different sides, which will be detailed below.

The RTCP-FB message may describe the radio capabilities on the receiving side and may be signaled from the MTSI receiver to the MTSI sender. The MTSI sender may basically learn about the radio capabilities on the MTSI receiver side and perform various media adaptation actions based on this information. When the UE for the MTSI receiver moves into a new access network, e.g., a handover from NR to LTE, then the MTSI receiver may send a new RTCP-FB message to the MTSI sender describing the radio capabilities over the new access network.

The RTCP FB message may be identified by payload type (PT)=payload-specific feedback (PSFB) message (206). Feedback message type (FMT) may be set to value 'Y' for radio capability information for the current access network. The RTCP FB based method may involve signaling of radio capability information for the current access network in both of the immediate feedback and early RTCP modes.

The RTP header extension message may describe the radio capabilities on the sending side and may be signaled from the MTSI sender to the MTSI receiver. The MTSI receiver would basically learn about the radio capabilities on the MTSI sender side and may perform various media adaptation actions based on this information. When the UE for the MTSI sender client moves into a new access network, e.g., a handover from NR to LTE, then the MTSI sender may send a new RTP header extension message to the MTSI receiver describing the radio capabilities over the new access network.

In an embodiment, the radio capability information may include information for delay budget reporting capability to indicate support of delay budget reporting by the UE and support of reception of delay budget report by the RAN to which the UE is connected. Delay budget reporting capability may be used to indicate, as described in detail in 3GPP TR 26.910 V2.0.0 (2018 September), e.g., for LTE access whether the UE is able to perform delay budget reporting and its eNB is able to receive delay budget reports, or for NR access whether the UE is able to perform delay budget reporting and its gNB is able to receive delay budget reports.

In an embodiment, the radio capability information may include information for ANBR signaling capability to indicate support of reception of ANBR information by the UE from its RAN and support of transmission of the ANBR information from the RAN to the UE, as described above. For example, ANBR signaling capability may be used to indicate, e.g., for LTE access whether the UE is able to receive ANBR from its eNB and whether its eNB is able to send ANBR information to the UE, or for NR access whether the UE is able to receive ANBR and its gNB is able to send ANBR. The ANBR information may include uplink ANBR information for the UE and downlink ANBR information for the UE, which is not limited in the disclosure.

The RTCP FB message signaled from the MTSI receiver to the MTSI sender may carry radio capability information for both downlink and uplink. For example, in case of ANBR signaling capability, the message would indicate the ability for the eNB/gNB to send and UE to receive downlink ANBR, uplink ANBR or both.

The RTP header extension message signaled from the MTSI sender to the MTSI receiver may carry radio capability information for both downlink and uplink. For example, in case of ANBR signaling capability, the message would indicate the ability for the eNB/gNB to send and UE to receive downlink ANBR, uplink ANBR or both.

Feedback control information (FCI) format for the RTCP FB may contain exactly one instance of the radio capability information for the current access network. For example, the radio capability information may include: i) ANBR_support—Boolean parameter on ANBR signaling capability, e.g., for LTE access whether the UE is able to receive ANBR from its eNB and whether its eNB is able to send ANBR information to the UE, or for NR access whether the UE is able to receive ANBR and its gNB is able to send ANBR; and ii) Delay_budget—Boolean parameter on delay budget reporting capability, as described in detail in 3GPP TR 26.910 V2.0.0, e.g., for LTE access whether the UE is able to perform delay budget reporting and its eNB is able to receive delay budget reports, or for NR access whether the UE is able to perform delay budget reporting and its gNB is able to receive delay budget reports A 3GPP MTSI client supporting this RTCP FB message may offer such capability in the SDP for all media streams containing video/audio. The offer may be made by including attribute "a=rtcp-fb" in conjunction with parameter "3gpp-radio-capability". A wildcard payload type ("*") may be used to indicate that the RTCP FB attribute applies to all payload types. Here is an example usage of this attribute: a=rtcp-fb:* 3gpp-radio-capability.

The Augmented Backus-Naur Form (ABNF) for rtcp-fb-val corresponding to the feedback type "3gpp-radio-capability" may be given as follows: rtcp-fb-val=/"3gpp-radio-capability".

Figure 7:
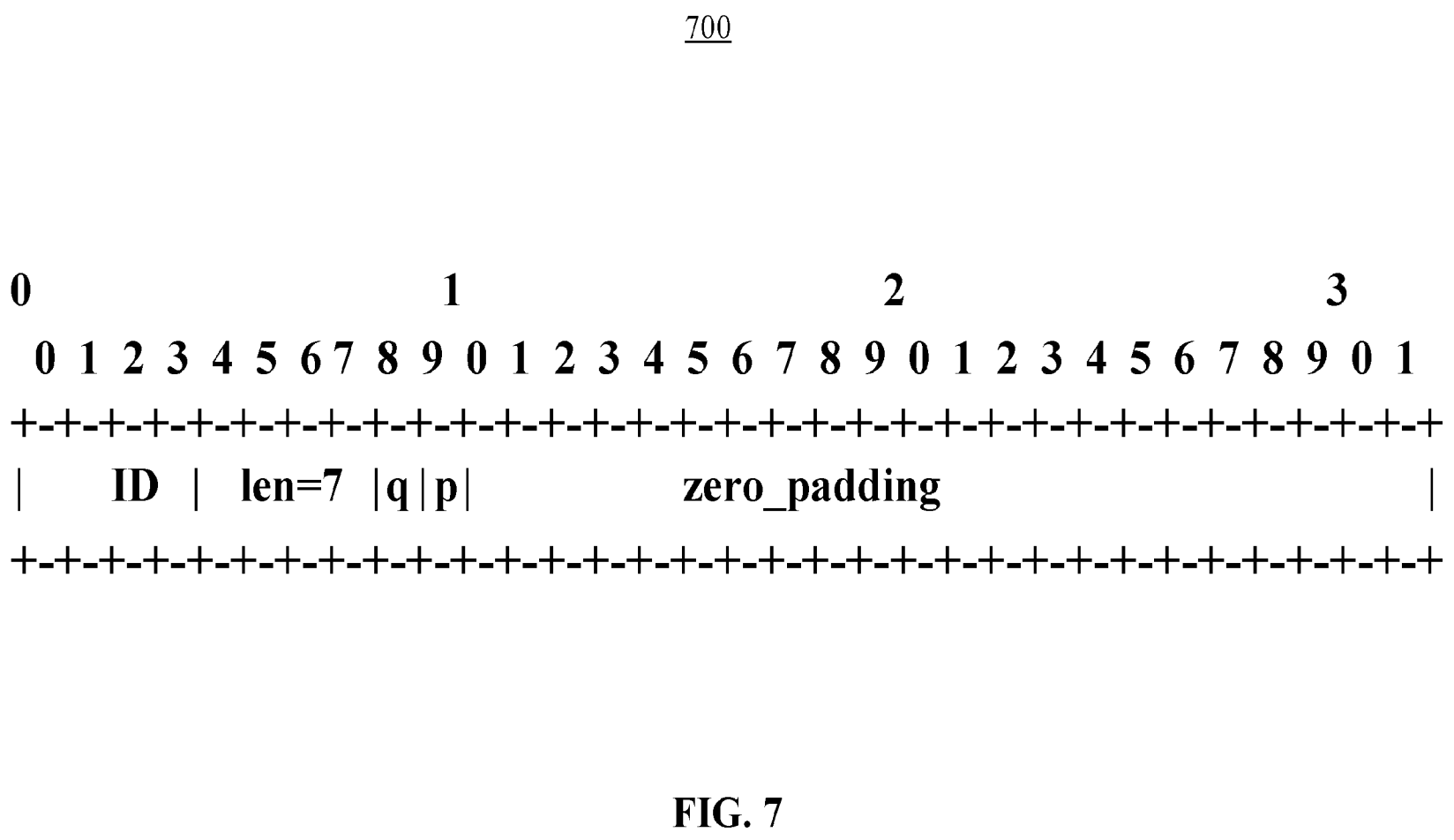

FIG. 7 illustrates a schematic diagram showing an example of RTP header extension message format 700 in accordance with some embodiments of the disclosure.

As shown in FIG. 7, parameters "q" and "p" are included in the RTP header extension message. Parameter "q" may be a Boolean parameter on ANBR signaling capability. For example, it may indicate, for LTE access, whether the UE is able to receive ANBR information from its eNB and whether its eNB is able to send ANBR information to the UE, or for NR access, whether the UE is able to receive ANBR information and its gNB is able to send ANBR information. Parameter "p" may be a Boolean parameter on delay budget reporting capability, as described in detail in 3GPP TR 26.910 V2.0.0. For example, it may indicate, for LTE access whether the UE is able to perform delay budget reporting and its eNB is able to receive delay budget reports, or for NR access whether the UE is able to perform delay budget reporting and its gNB is able to receive delay budget reports.

A 3GPP MTSI client (based on the 3GPP TS 26.114 V15.3.0) supporting this RTP header extension message may offer such capability in the SDP for all media streams containing video/audio. This capability may be offered by including attribute "a=extmap" indicating a dedicated uniform resource name (URN) under the relevant media line scope. The URN corresponding to the capability to signal radio capability information for the current access network is: urn:3gpp:radio-capability. Here is an example usage of this URN in the SDP: a=extmap:7 urn:3gpp:radio-capability. The number 7 in the example may be replaced with any number in the range 1-14.

Embodiments described herein provide SDP and RTP/RTCP-based techniques for negotiating support of ANBR capability and RAN-assisted codec adaptation capabilities. With such indications of ANBR capability and RAN-assisted codec adaptation capability, the UE can receive ANBR information from corresponding RAN, and its MTSI client is capable of perform actions triggered by the ANBR information as defined in clause 10.7 of 3GPP TS 26.114 V15.3.0. As a result, end-to-end coordination between UEs and access networks on their ANBR capability is achieved, thus end-to-end quality of VoLTE calls can be improved.

Figure 8:
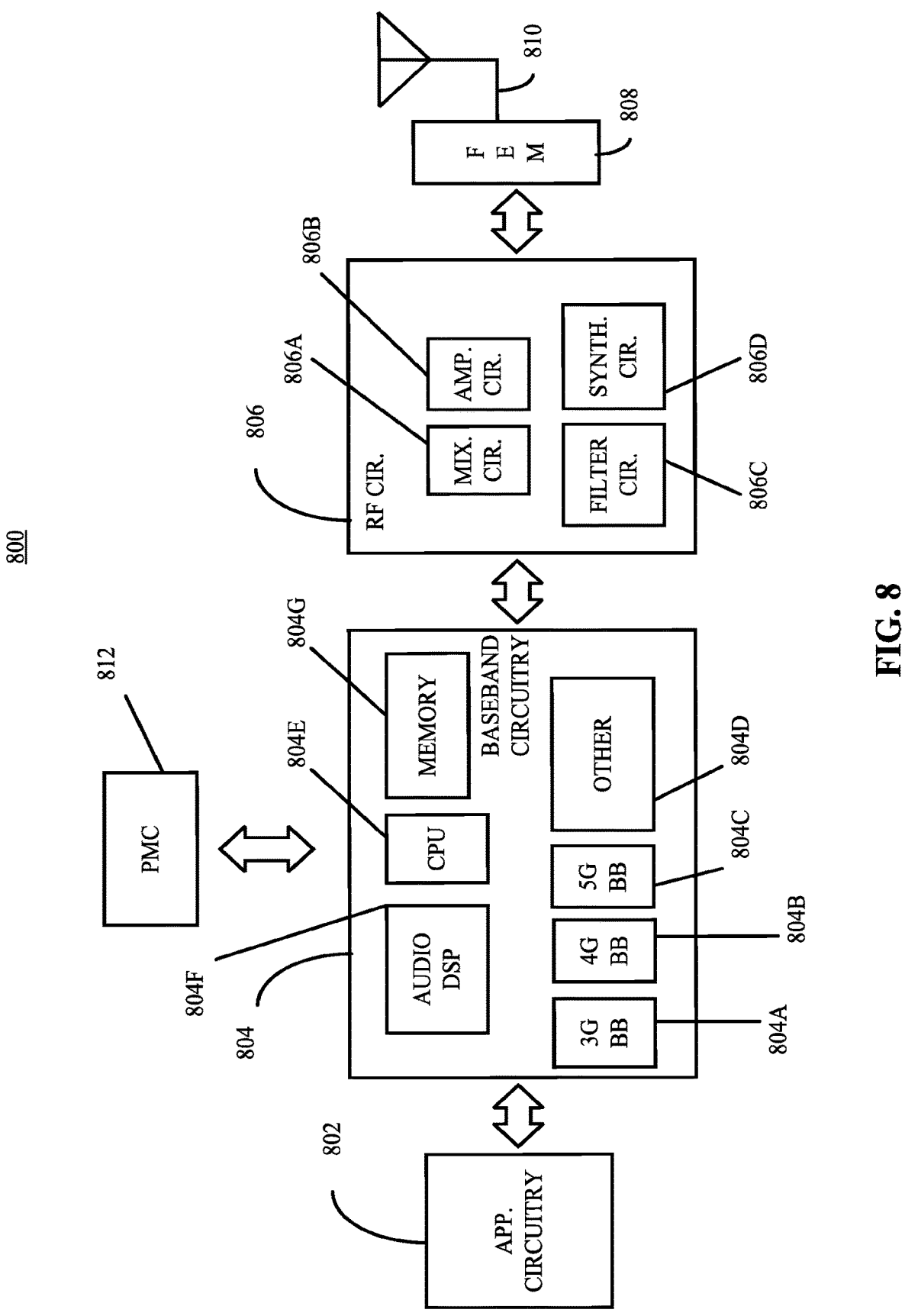
FIG. 8 illustrates example components of a device in accordance with some embodiments of the disclosure.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or an AN node. In some embodiments, the device 800 may include less elements (e.g., an AN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider.

The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer. As referred to herein, Layer 2 may comprise a medium access control (MAC) layer, a radio link control (RLC) layer, and a packet data convergence protocol (PDCP) layer. As referred to herein, Layer 1 may comprise a physical (PHY) layer of a UE/RAN node.

Figure 9:
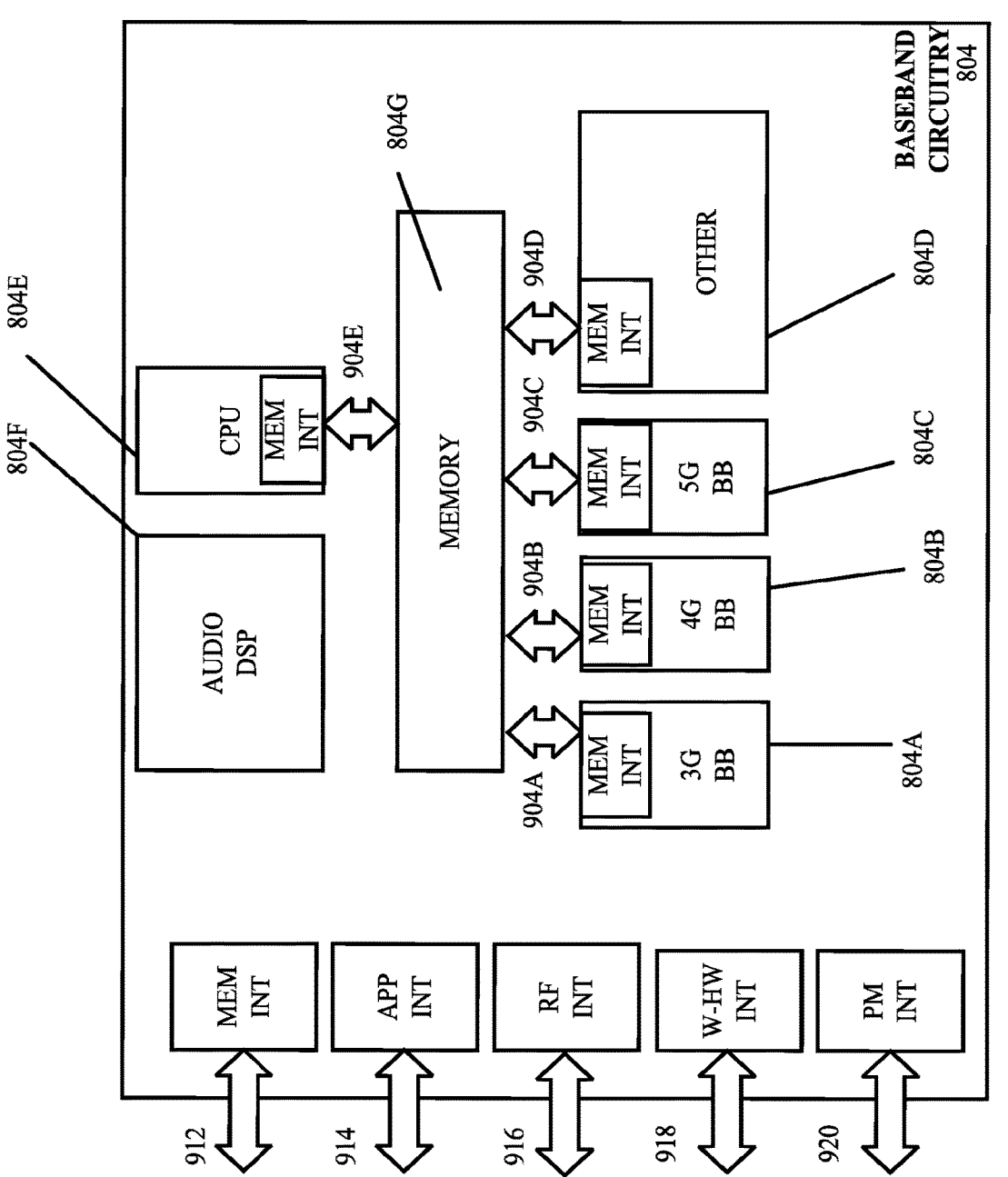
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
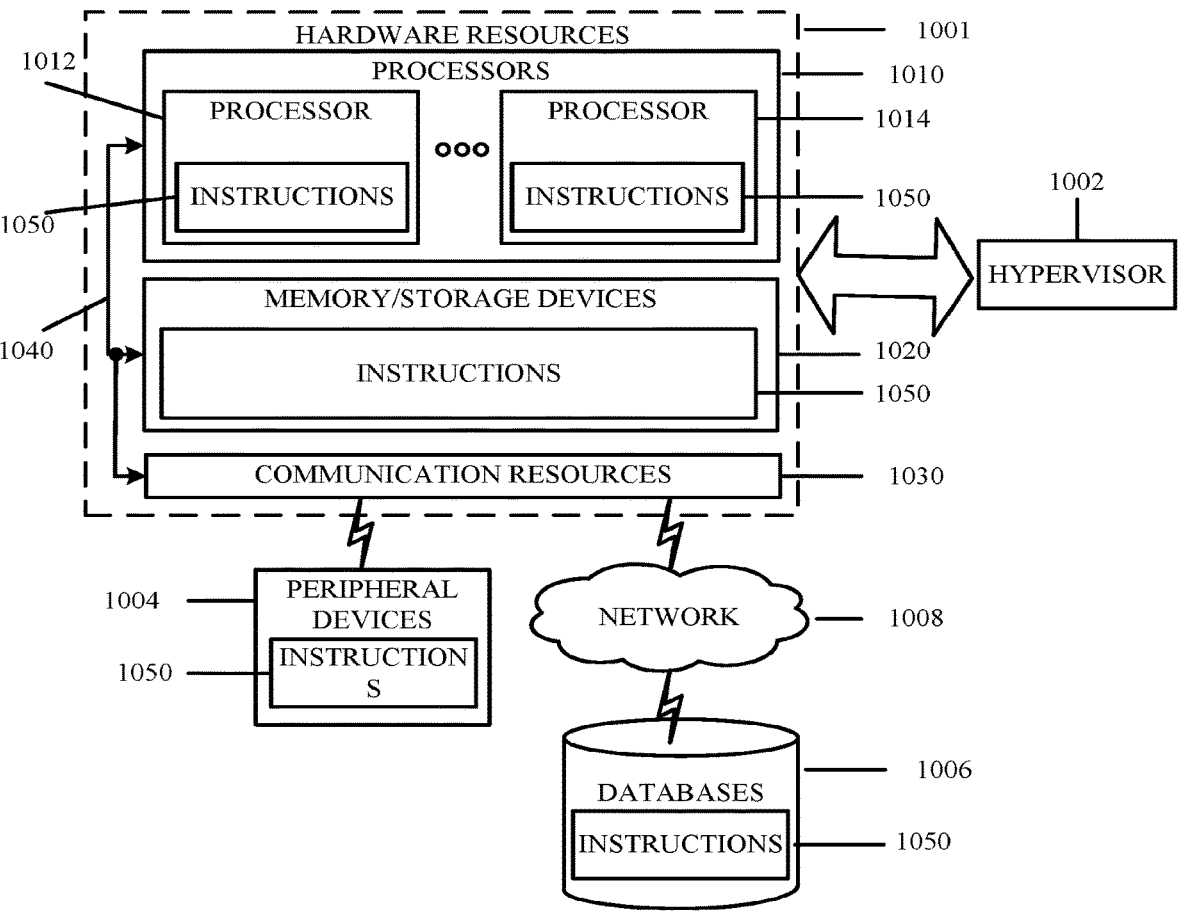
FIG. 10 is a block diagram illustrating components, according to some example embodiments, able to read instructions from a machine-readable or computer-readable medium and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

The following paragraphs describe examples of various embodiments.

Example 1 includes an apparatus for a user equipment (UE) operable to stream media of a multimedia telephony session with a remote UE, the apparatus comprising: a radio frequency (RF) interface to receive a session description protocol (SDP) offer message from the remote UE, wherein the SDP offer message includes a first dedicated SDP attribute parameter to indicate support of access network bitrate recommendation (ANBR) capability of the remote UE, and wherein the ANBR capability of the remote UE corresponds to an ability to receive ANBR information from a remote radio access network (RAN) to which the remote UE is connected or an ability of the remote RAN to transmit the ANBR information; and processor circuitry coupled with the RF interface, wherein the processor circuitry is to: decode the SDP offer message received from the RF interface to obtain the first dedicated SDP attribute parameter to determine the support of ANBR capability of the remote UE; encode an SDP answer message in response to the SDP offer message, wherein the SDP answer message includes a second dedicated SDP attribute parameter to indicate support of ANBR capability of the UE, and wherein the ANBR capability of the UE corresponds to an ability to receive ANBR information from a RAN to which the UE is connected or an ability of the RAN to transmit the ANBR information; and cause transmission of the SDP answer message to the remote UE.

Example 2 includes the apparatus of Example 1, wherein both of the first dedicated SDP attribute parameter and the second dedicated SDP attribute parameter are identified as "ANBR_adapt".

Example 3 includes the apparatus of Example 1, wherein the second dedicated SDP attribute parameter is further to indicate support of RAN-assisted codec adaptation of the UE, and the first dedicated SDP attribute parameter is further to indicate support of RAN-assisted codec adaptation of the remote UE.

Example 4 includes the apparatus of Example 3, wherein the RAN-assisted codec adaptation of the UE is performed by the UE based on the ANBR information received from the RAN, and the RAN-assisted codec adaptation of the remote UE is performed by the remote UE based on the ANBR information received from the remote RAN.

Example 5 includes the apparatus of Example 4, wherein the ANBR information received by the UE from the RAN is uplink ANBR information, and wherein the processor circuitry is to adjust a sending bitrate for transmission of the media of the multimedia telephony session based on the uplink ANBR information.

Example 6 includes the apparatus of Example 5, wherein the sending bitrate is decreased to a bitrate value indicated by the uplink ANBR information when the bitrate value is smaller than the sending bitrate.

Example 7 includes the apparatus of Example 5, wherein the sending bitrate is increased to the smallest one among a bitrate value indicated by the uplink ANBR information and a bitrate value restricted by each of other bitrate adaptation triggers for the UE, when the bitrate value indicated by the uplink ANBR information is greater than the sending bitrate.

Example 8 includes the apparatus of Example 7, wherein the ANBR information received by the remote UE from the remote RAN is downlink ANBR information, and wherein the processor circuitry is to adjust the sending bitrate further based on the downlink ANBR information for the remote UE when the bitrate value is greater than the sending bitrate.

Example 9 includes the apparatus of any of Examples 1-8, wherein the media includes speech or video.

Example 10 includes the apparatus of Example 4, wherein the ANBR information received by the UE from the RAN is downlink ANBR information, the media includes speech, and wherein the processor circuitry is to: encode a codec mode request (CMR)/real-time transport control protocol (RTCP)-application (RTCP-APP) message for transmission to the remote UE based on the downlink ANBR information received from the RAN, wherein the CMR/RTCP-APP message is to indicate a desired receiving bitrate for reception of the speech of the multimedia telephony session.

Example 11 includes the apparatus of Example 10, the desired receiving bitrate is determined to be a bitrate value indicated by the downlink ANBR information, when the bitrate value indicated by the downlink ANBR information is smaller than a receiving bitrate for reception of the speech of the multimedia telephony session.

Example 12 includes the apparatus of Example 10, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the speech of the multimedia telephony session.

Example 13 includes the apparatus of Example 4, wherein the ANBR information received by the UE from the RAN is downlink ANBR information, the media includes video, and wherein the processor circuitry is to: encode a real-time transport control protocol (RTCP) temporary maximum media stream bitrate request (TMMBR) message for transmission to the remote UE based on the downlink ANBR information received from the RAN, wherein the RTCP TMMBR message is to indicate a desired receiving bitrate for reception of the video of the multimedia telephony session.

Example 14 includes the apparatus of Example 13, the desired receiving bitrate is determined to be a bitrate value indicated by the downlink ANBR information, when the bitrate value indicated by the downlink ANBR information is smaller than a receiving bitrate for reception of the video of the multimedia telephony session.

Example 15 includes the apparatus of Example 13, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the video of the multimedia telephony session.

Example 16 includes an apparatus for a user equipment (UE) operable to stream media of a multimedia telephony session with a remote UE, the apparatus comprising: a radio frequency (RF) interface to receive a session description protocol (SDP) offer message from the remote UE, wherein the SDP offer message includes a first dedicated SDP attribute parameter to indicate support of radio access network (RAN)-assisted codec adaptation of the remote UE; and processor circuitry coupled with the RF interface, wherein the processor circuitry is to: decode the SDP offer message received from the RF interface; encode an SDP answer message in response to the SDP offer message, wherein the SDP answer message includes a second dedicated SDP attribute parameter to indicate support of RAN-assisted codec adaptation of the UE; and cause transmission of the SDP answer message to the remote UE.

Example 17 includes the apparatus of Example 16, wherein the RAN-assisted codec adaptation for a sending bitrate of the UE is performed based on uplink access network bitrate recommendation (ANBR) information received from a RAN to which the UE is connected, the RAN-assisted codec adaptation for a receiving bitrate of the UE is performed based on downlink ANBR information received from the RAN, the RAN-assisted codec adaptation for a sending bitrate of the remote UE is performed based on uplink ANBR information received from a remote RAN to which the remote UE is connected, and the RAN-assisted codec adaptation for a receiving bitrate of the remote UE is performed based on downlink ANBR information received from the remote RAN.

Example 18 includes the apparatus of Example 17, wherein both of the first dedicated SDP attribute parameter and the second dedicated SDP attribute parameter are identified as "ANBR_adapt".

Example 19 includes the apparatus of Example 17, wherein the processor circuitry is to adjust a sending bitrate for transmission of the media of the multimedia telephony session based on the uplink ANBR information received from the RAN.

Example 20 includes the apparatus of Example 19, wherein the sending bitrate is decreased to a bitrate value indicated by the uplink ANBR information when the bitrate value is smaller than the sending bitrate.

Example 21 includes the apparatus of Example 19, wherein the sending bitrate is increased to the smallest one among a bitrate value indicated by the uplink ANBR information and a bitrate value restricted by each of other bitrate adaptation triggers for the UE, when the bitrate value indicated by the uplink ANBR information is greater than the sending bitrate.

Example 22 includes the apparatus of Example 21, wherein the processor circuitry is to adjust the sending bitrate further based on the downlink ANBR information for the remote UE when the bitrate value is greater than the sending bitrate.

Example 23 includes the apparatus of any of Examples 16-22, wherein the media includes speech or video.

Example 24 includes an apparatus for a user equipment (UE) operable to stream media of a multimedia telephony session with a remote UE, the apparatus comprising: a radio frequency (RF) interface; and processor circuitry coupled with the RF interface, wherein the processor circuitry is to: encode a session description protocol (SDP) offer message including a first dedicated SDP attribute parameter to indicate support of radio access network (RAN)-assisted codec adaptation of the UE; cause transmission of the SDP offer message to the remote UE; and decode an SDP answer message transmitted from the remote UE in response to the SDP offer message, wherein the SDP answer message includes a second dedicated SDP attribute parameter to indicate support of RAN-assisted codec adaptation of the remote UE.

Example 25 includes the apparatus of Example 24, wherein the RAN-assisted codec adaptation for a sending bitrate of the UE is performed based on uplink access network bitrate recommendation (ANBR) information received from a RAN to which the UE is connected, the RAN-assisted codec adaptation for a receiving bitrate of the UE is performed based on downlink ANBR information received from the RAN, the RAN-assisted codec adaptation for a sending bitrate of the remote UE is performed based on uplink ANBR information received from a remote RAN to which the remote UE is connected, and the RAN-assisted codec adaptation for a receiving bitrate of the remote UE is performed based on downlink ANBR information received from the remote RAN.

Example 26 includes the apparatus of Example 25, wherein both of the first dedicated SDP attribute parameter and the second dedicated SDP attribute parameter are identified as "ANBR_adapt".

Example 27 includes the apparatus of Example 25 or 26, wherein the media includes speech, and wherein the processor circuitry is to: encode, based on the downlink ANBR information received from the RAN, a codec mode request (CMR)/real-time transport control protocol (RTCP)-application (RTCP-APP) message for transmission to the remote UE, wherein the CMR/RTCP-APP message is to indicate a desired receiving bitrate for reception of the speech of the multimedia telephony session.

Example 28 includes the apparatus of Example 27, the desired receiving bitrate is determined to be a bitrate value indicated by the downlink ANBR information, when the bitrate value indicated by the downlink ANBR information is smaller than a receiving bitrate for reception of the speech of the multimedia telephony session.

Example 29 includes the apparatus of Example 27, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the speech of the multimedia telephony session.

Example 30 includes the apparatus of Example 25 or 26, wherein the media includes video, and wherein the processor circuitry is to: encode a real-time transport control protocol (RTCP) temporary maximum media stream bitrate request (TMMBR) message for transmission to the remote UE based on the downlink ANBR information received from the RAN, wherein the RTCP TMMBR message is to indicate a desired receiving bitrate for reception of the video of the multimedia telephony session.

Example 31 includes the apparatus of Example 30, the desired receiving bitrate is determined to be a bitrate value indicated by the downlink ANBR information, when the bitrate value indicated by the downlink ANBR information is smaller than a receiving bitrate for reception of the video of the multimedia telephony session.

Example 32 includes the apparatus of Example 30, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the video of the multimedia telephony session.

Example 33 includes an apparatus for a user equipment (UE) operable to stream media of a multimedia telephony session with a remote UE, the apparatus comprising: a radio frequency (RF) interface; and processor circuitry coupled with the RF interface, wherein the processor circuitry is to: encode a message including radio capability information of the UE; and cause transmission of the message to the remote UE.

Example 34 includes the apparatus of Example 33, wherein the message includes an application layer message.

Example 35 includes the apparatus of Example 34, wherein the application layer message includes: a real-time transport control protocol (RTCP) feedback message; or a real-time transport protocol (RTP) header extension message.

Example 36 includes the apparatus of Example 33, wherein the message includes a session description protocol (SDP) message during an internet protocol (IP) multimedia subsystem (IMS)/session initiation protocol (SIP) based capability negotiation, wherein the SDP message includes: a dedicated SDP parameter on a real-time transport control protocol (RTCP) based ability; or a dedicated SDP parameter on a real-time transport protocol (RTP) based ability.

Example 37 includes the apparatus of any of Examples 33 to 36, wherein the radio capability information includes information for delay budget reporting capability to indicate support of delay budget reporting by the UE and support of reception of delay budget report by a radio access network (RAN) to which the UE is connected.

Example 38 includes the apparatus of any of Examples 33 to 36, wherein the radio capability information includes information for access network bitrate recommendation (ANBR) signaling capability to indicate support of reception of ANBR information by the UE from a radio access network (RAN) to which the UE is connected and support of transmission of the ANBR information from the RAN to the UE.

Example 39 includes the apparatus of Example 38, wherein the ANBR information includes uplink ANBR information for the UE and downlink ANBR information for the UE.

Example 40 includes the apparatus of any of Examples 37 to 39, wherein the RAN includes an access node, and wherein the access node includes an enhanced NodeB (eNB) or a next generation NodeB (gNB).

Example 41 includes a method for a user equipment (UE) operable to stream media of a multimedia telephony session with a remote UE, the method comprising: decoding a session description protocol (SDP) offer message received from the remote UE, wherein the SDP offer message includes a first dedicated SDP attribute parameter to indicate support of access network bitrate recommendation (ANBR) capability of the remote UE, and wherein the ANBR capability of the remote UE corresponds to an ability to receive ANBR information from a remote radio access network (RAN) to which the remote UE is connected or an ability of the remote RAN to transmit the ANBR information; encoding an SDP answer message in response to the SDP offer message, wherein the SDP answer message includes a second dedicated SDP attribute parameter to indicate support of ANBR capability of the UE, and wherein the ANBR capability of the UE corresponds to an ability to receive ANBR information from a RAN to which the UE is connected or an ability of the RAN to transmit the ANBR information; and transmitting the SDP answer message to the remote UE.

Example 42 includes the method of Example 41, wherein both of the first dedicated SDP attribute parameter and the second dedicated SDP attribute parameter are identified as "ANBR_adapt".

Example 43 includes the method of Example 41 or 42, wherein the second dedicated SDP attribute parameter is further to indicate support of RAN-assisted codec adaptation of the UE, and the first dedicated SDP attribute parameter is further to indicate support of RAN-assisted codec adaptation of the remote UE.

Example 44 includes the method of Example 43, wherein the RAN-assisted codec adaptation of the UE is performed by the UE based on the ANBR information received from the RAN, and the RAN-assisted codec adaptation of the remote UE is performed by the remote UE based on the ANBR information received from the remote RAN.

Example 45 includes the method of Example 44, wherein the ANBR information received by the UE from the RAN is uplink ANBR information, and wherein the method further includes adjusting a sending bitrate for transmission of the media of the multimedia telephony session based on the uplink ANBR information.

Example 46 includes the method of Example 45, wherein the sending bitrate is decreased to a bitrate value indicated by the uplink ANBR information when the bitrate value is smaller than the sending bitrate.

Example 47 includes the method of Example 45, wherein the sending bitrate is increased to the smallest one among a bitrate value indicated by the uplink ANBR information and a bitrate value restricted by each of other bitrate adaptation triggers for the UE, when the bitrate value indicated by the uplink ANBR information is greater than the sending bitrate.

Example 48 includes the method of Example 47, wherein the ANBR information received by the remote UE from the remote RAN is downlink ANBR information, and wherein the method further includes adjusting the sending bitrate further based on the downlink ANBR information for the remote UE when the bitrate value is greater than the sending bitrate.

Example 49 includes the method of any of Examples 41-48, wherein the media includes speech or video.

Example 50 includes the method of Example 44, wherein the ANBR information received by the UE from the RAN is downlink ANBR information, the media includes speech, and wherein the method further includes: encoding a codec mode request (CMR)/real-time transport control protocol (RTCP)-application (RTCP-APP) message for transmission to the remote UE based on the downlink ANBR information received from the RAN, wherein the CMR/RTCP-APP message is to indicate a desired receiving bitrate for reception of the speech of the multimedia telephony session.

Example 51 includes the method of Example 50, the desired receiving bitrate is determined to be a bitrate value indicated by the downlink ANBR information, when the bitrate value indicated by the downlink ANBR information is smaller than a receiving bitrate for reception of the speech of the multimedia telephony session.

Example 52 includes the method of Example 50, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the speech of the multimedia telephony session.

Example 53 includes the method of Example 44, wherein the ANBR information received by the UE from the RAN is downlink ANBR information, the media includes video, and wherein the method further includes: encoding a real-time transport control protocol (RTCP) temporary maximum media stream bitrate request (TMMBR) message for transmission to the remote UE based on the downlink ANBR information received from the RAN, wherein the RTCP TMMBR message is to indicate a desired receiving bitrate for reception of the video of the multimedia telephony session.

Example 54 includes the method of Example 53, the desired receiving bitrate is determined to be a bitrate value indicated by the downlink ANBR information, when the bitrate value indicated by the downlink ANBR information is smaller than a receiving bitrate for reception of the video of the multimedia telephony session.

Example 55 includes the method of Example 53, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the video of the multimedia telephony session.

Example 56 includes a method for a user equipment (UE) operable to stream media of a multimedia telephony session with a remote UE, the method comprising: decoding a session description protocol (SDP) offer message from the remote UE, wherein the SDP offer message includes a first dedicated SDP attribute parameter to indicate support of radio access network (RAN)-assisted codec adaptation of the remote UE; encoding an SDP answer message in response to the SDP offer message, wherein the SDP answer message includes a second dedicated SDP attribute parameter to indicate support of RAN-assisted codec adaptation of the UE; and transmitting the SDP answer message to the remote UE.

Example 57 includes the method of Example 56, wherein the RAN-assisted codec adaptation for a sending bitrate of the UE is performed based on uplink access network bitrate recommendation (ANBR) information received from a RAN to which the UE is connected, the RAN-assisted codec adaptation for a receiving bitrate of the UE is performed based on downlink ANBR information received from the RAN, the RAN-assisted codec adaptation for a sending bitrate of the remote UE is performed based on uplink ANBR information received from a remote RAN to which the remote UE is connected, and the RAN-assisted codec adaptation for a receiving bitrate of the remote UE is performed based on downlink ANBR information received from the remote RAN.

Example 58 includes the method of Example 57, wherein both of the first dedicated SDP attribute parameter and the second dedicated SDP attribute parameter are identified as "ANBR_adapt".

Example 59 includes the method of Example 57, wherein the method further includes adjusting a sending bitrate for transmission of the media of the multimedia telephony session based on the uplink ANBR information received from the RAN.

Example 60 includes the method of Example 59, wherein the sending bitrate is decreased to a bitrate value indicated by the uplink ANBR information when the bitrate value is smaller than the sending bitrate.

Example 61 includes the method of Example 59, wherein the sending bitrate is increased to the smallest one among a bitrate value indicated by the uplink ANBR information and a bitrate value restricted by each of other bitrate adaptation triggers for the UE, when the bitrate value indicated by the uplink ANBR information is greater than the sending bitrate.

Example 62 includes the method of Example 61, wherein the method further includes adjusting the sending bitrate further based on the downlink ANBR information for the remote UE when the bitrate value is greater than the sending bitrate.

Example 63 includes the method of any of Examples 56-62, wherein the media includes speech or video.

Example 64 includes a method for a user equipment (UE) operable to stream media of a multimedia telephony session with a remote UE, the method comprising: encoding a session description protocol (SDP) offer message including a first dedicated SDP attribute parameter to indicate support of radio access network (RAN)-assisted codec adaptation of the UE; transmitting the SDP offer message to the remote UE; and decode an SDP answer message transmitted from the remote UE in response to the SDP offer message, wherein the SDP answer message includes a second dedicated SDP attribute parameter to indicate support of RAN-assisted codec adaptation of the remote UE.

Example 65 includes the method of Example 64, wherein the RAN-assisted codec adaptation for a sending bitrate of the UE is performed based on uplink access network bitrate recommendation (ANBR) information received from a RAN to which the UE is connected, the RAN-assisted codec adaptation for a receiving bitrate of the UE is performed based on downlink ANBR information received from the RAN, the RAN-assisted codec adaptation for a sending bitrate of the remote UE is performed based on uplink ANBR information received from a remote RAN to which the remote UE is connected, and the RAN-assisted codec adaptation for a receiving bitrate of the remote UE is performed based on downlink ANBR information received from the remote RAN.

Example 66 includes the method of Example 65, wherein both of the first dedicated SDP attribute parameter and the second dedicated SDP attribute parameter are identified as "ANBR_adapt".

Example 67 includes the method of Example 65 or 66, wherein the media includes speech, and wherein the method further includes: encoding, based on the downlink ANBR information received from the RAN, a codec mode request (CMR)/real-time transport control protocol (RTCP)-application (RTCP-APP) message for transmission to the remote UE, wherein the CMR/RTCP-APP message is to indicate a desired receiving bitrate for reception of the speech of the multimedia telephony session.

Example 68 includes the method of Example 67, the desired receiving bitrate is determined to be a bitrate value indicated by the downlink ANBR information, when the bitrate value indicated by the downlink ANBR information is smaller than a receiving bitrate for reception of the speech of the multimedia telephony session.

Example 69 includes the method of Example 67, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the speech of the multimedia telephony session.

Example 70 includes the method of Example 65 or 66, wherein the media includes video, and wherein the method further includes: encoding a real-time transport control protocol (RTCP) temporary maximum media stream bitrate request (TMMBR) message for transmission to the remote UE based on the downlink ANBR information received from the RAN, wherein the RTCP TMMBR message is to indicate a desired receiving bitrate for reception of the video of the multimedia telephony session.

Example 71 includes the method of Example 70, the desired receiving bitrate is determined to be a bitrate value indicated by the downlink ANBR information, when the bitrate value indicated by the downlink ANBR information is smaller than a receiving bitrate for reception of the video of the multimedia telephony session.

Example 72 includes the method of Example 70, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the video of the multimedia telephony session.

Example 73 includes a method for a user equipment (UE) operable to stream media of a multimedia telephony session with a remote UE, the method comprising: encoding a message including radio capability information of the UE; and transmitting the message to the remote UE.

Example 74 includes the method of Example 73, wherein the message includes an application layer message.

Example 75 includes the method of Example 74, wherein the application layer message includes: a real-time transport control protocol (RTCP) feedback message; or a real-time transport protocol (RTP) header extension message.

Example 76 includes the method of Example 73, wherein the message includes a session description protocol (SDP) message during an internet protocol (IP) multimedia subsystem (IMS)/session initiation protocol (SIP) based capability negotiation, wherein the SDP message includes: a dedicated SDP parameter on a real-time transport control protocol (RTCP) based ability; or a dedicated SDP parameter on a real-time transport protocol (RTP) based ability.

Example 77 includes the method of any of Examples 73 to 76, wherein the radio capability information includes information for delay budget reporting capability to indicate support of delay budget reporting by the UE and support of reception of delay budget report by a radio access network (RAN) to which the UE is connected.

Example 78 includes the method of any of Examples 73 to 76, wherein the radio capability information includes information for access network bitrate recommendation (ANBR) signaling capability to indicate support of reception of ANBR information by the UE from a radio access network (RAN) to which the UE is connected and support of transmission of the ANBR information from the RAN to the UE.

Example 79 includes the method of Example 78, wherein the ANBR information includes uplink ANBR information for the UE and downlink ANBR information for the UE.

Example 80 includes the method of any of Examples 77 to 79, wherein the RAN includes an access node, and wherein the access node includes an enhanced NodeB (eNB) or a next generation NodeB (gNB).

Example 81 includes an apparatus for a user equipment (UE) operable to stream media of a multimedia telephony session with a remote UE, the apparatus comprising: means for decoding a session description protocol (SDP) offer message received from the remote UE, wherein the SDP offer message includes a first dedicated SDP attribute parameter to indicate support of access network bitrate recommendation (ANBR) capability of the remote UE, and wherein the ANBR capability of the remote UE corresponds to an ability to receive ANBR information from a remote radio access network (RAN) to which the remote UE is connected or an ability of the remote RAN to transmit the ANBR information; means for encoding an SDP answer message in response to the SDP offer message, wherein the SDP answer message includes a second dedicated SDP attribute parameter to indicate support of ANBR capability of the UE, and wherein the ANBR capability of the UE corresponds to an ability to receive ANBR information from a RAN to which the UE is connected or an ability of the RAN to transmit the ANBR information; and means for transmitting the SDP answer message to the remote UE.

Example 82 includes the apparatus of Example 81, wherein both of the first dedicated SDP attribute parameter and the second dedicated SDP attribute parameter are identified as "ANBR_adapt".

Example 83 includes the apparatus of Example 81 or 82, wherein the second dedicated SDP attribute parameter is further to indicate support of RAN-assisted codec adaptation of the UE, and the first dedicated SDP attribute parameter is further to indicate support of RAN-assisted codec adaptation of the remote UE.

Example 84 includes the apparatus of Example 83, wherein the RAN-assisted codec adaptation of the UE is performed by the UE based on the ANBR information received from the RAN, and the RAN-assisted codec adaptation of the remote UE is performed by the remote UE based on the ANBR information received from the remote RAN.

Example 85 includes the apparatus of Example 84, wherein the ANBR information received by the UE from the RAN is uplink ANBR information, and wherein the apparatus further includes adjusting a sending bitrate for transmission of the media of the multimedia telephony session based on the uplink ANBR information.

Example 86 includes the apparatus of Example 85, wherein the sending bitrate is decreased to a bitrate value indicated by the uplink ANBR information when the bitrate value is smaller than the sending bitrate.

Example 87 includes the apparatus of Example 85, wherein the sending bitrate is increased to the smallest one among a bitrate value indicated by the uplink ANBR information and a bitrate value restricted by each of other bitrate adaptation triggers for the UE, when the bitrate value indicated by the uplink ANBR information is greater than the sending bitrate.

Example 88 includes the apparatus of Example 87, wherein the ANBR information received by the remote UE from the remote RAN is downlink ANBR information, and wherein the apparatus further includes means for adjusting the sending bitrate further based on the downlink ANBR information for the remote UE when the bitrate value is greater than the sending bitrate.

Example 89 includes the apparatus of any of Examples 81-88, wherein the media includes speech or video.

Example 90 includes the apparatus of Example 84, wherein the ANBR information received by the UE from the RAN is downlink ANBR information, the media includes speech, and wherein the apparatus further includes: means for encoding a codec mode request (CMR)/real-time transport control protocol (RTCP)-application (RTCP-APP) message for transmission to the remote UE based on the downlink ANBR information received from the RAN, wherein the CMR/RTCP-APP message is to indicate a desired receiving bitrate for reception of the speech of the multimedia telephony session.

Example 91 includes the apparatus of Example 90, the desired receiving bitrate is determined to be a bitrate value indicated by the downlink ANBR information, when the bitrate value indicated by the downlink ANBR information is smaller than a receiving bitrate for reception of the speech of the multimedia telephony session.

Example 92 includes the apparatus of Example 90, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the speech of the multimedia telephony session.

Example 93 includes the apparatus of Example 84, wherein the ANBR information received by the UE from the RAN is downlink ANBR information, the media includes video, and wherein the apparatus further includes: means for encoding a real-time transport control protocol (RTCP) temporary maximum media stream bitrate request (TMMBR) message for transmission to the remote UE based on the downlink ANBR information received from the RAN, wherein the RTCP TMMBR message is to indicate a desired receiving bitrate for reception of the video of the multimedia telephony session.

Example 94 includes the apparatus of Example 93, the desired receiving bitrate is determined to be a bitrate value indicated by the downlink ANBR information, when the bitrate value indicated by the downlink ANBR information is smaller than a receiving bitrate for reception of the video of the multimedia telephony session.

Example 95 includes the apparatus of Example 93, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the video of the multimedia telephony session.

Example 96 includes an apparatus for a user equipment (UE) operable to stream media of a multimedia telephony session with a remote UE, the apparatus comprising: means for decoding a session description protocol (SDP) offer message from the remote UE, wherein the SDP offer message includes a first dedicated SDP attribute parameter to indicate support of radio access network (RAN)-assisted codec adaptation of the remote UE; means for encoding an SDP answer message in response to the SDP offer message, wherein the SDP answer message includes a second dedicated SDP attribute parameter to indicate support of RAN-assisted codec adaptation of the UE; and means for transmitting the SDP answer message to the remote UE.

Example 97 includes the apparatus of Example 96, wherein the RAN-assisted codec adaptation for a sending bitrate of the UE is performed based on uplink access network bitrate recommendation (ANBR) information received from a RAN to which the UE is connected, the RAN-assisted codec adaptation for a receiving bitrate of the UE is performed based on downlink ANBR information received from the RAN, the RAN-assisted codec adaptation for a sending bitrate of the remote UE is performed based on uplink ANBR information received from a remote RAN to which the remote UE is connected, and the RAN-assisted codec adaptation for a receiving bitrate of the remote UE is performed based on downlink ANBR information received from the remote RAN.

Example 98 includes the apparatus of Example 97, wherein both of the first dedicated SDP attribute parameter and the second dedicated SDP attribute parameter are identified as "ANBR_adapt".

Example 99 includes the apparatus of Example 97, wherein the apparatus further includes means for adjusting a sending bitrate for transmission of the media of the multimedia telephony session based on the uplink ANBR information received from the RAN.

Example 100 includes the apparatus of Example 99, wherein the sending bitrate is decreased to a bitrate value indicated by the uplink ANBR information when the bitrate value is smaller than the sending bitrate.

Example 101 includes the apparatus of Example 99, wherein the sending bitrate is increased to the smallest one among a bitrate value indicated by the uplink ANBR information and a bitrate value restricted by each of other bitrate adaptation triggers for the UE, when the bitrate value indicated by the uplink ANBR information is greater than the sending bitrate.

Example 102 includes the apparatus of Example 101, wherein the apparatus further includes adjusting means for the sending bitrate further based on the downlink ANBR information for the remote UE when the bitrate value is greater than the sending bitrate.

Example 103 includes the apparatus of any of Examples 96-102, wherein the media includes speech or video.

Example 104 includes an apparatus for a user equipment (UE) operable to stream media of a multimedia telephony session with a remote UE, the apparatus comprising: means for encoding a session description protocol (SDP) offer message including a first dedicated SDP attribute parameter to indicate support of radio access network (RAN)-assisted codec adaptation of the UE; means for transmitting the SDP offer message to the remote UE; and means for decode an SDP answer message transmitted from the remote UE in response to the SDP offer message, wherein the SDP answer message includes a second dedicated SDP attribute parameter to indicate support of RAN-assisted codec adaptation of the remote UE.

Example 105 includes the apparatus of Example 104, wherein the RAN-assisted codec adaptation for a sending bitrate of the UE is performed based on uplink access network bitrate recommendation (ANBR) information received from a RAN to which the UE is connected, the RAN-assisted codec adaptation for a receiving bitrate of the UE is performed based on downlink ANBR information received from the RAN, the RAN-assisted codec adaptation for a sending bitrate of the remote UE is performed based on uplink ANBR information received from a remote RAN to which the remote UE is connected, and the RAN-assisted codec adaptation for a receiving bitrate of the remote UE is performed based on downlink ANBR information received from the remote RAN.

Example 106 includes the apparatus of Example 105, wherein both of the first dedicated SDP attribute parameter and the second dedicated SDP attribute parameter are identified as "ANBR_adapt".

Example 107 includes the apparatus of Example 105 or 106, wherein the media includes speech, and wherein the apparatus further includes: means for encoding, based on the downlink ANBR information received from the RAN, a codec mode request (CMR)/real-time transport control protocol (RTCP)-application (RTCP-APP) message for transmission to the remote UE, wherein the CMR/RTCP-APP message is to indicate a desired receiving bitrate for reception of the speech of the multimedia telephony session.

Example 108 includes the apparatus of Example 107, the desired receiving bitrate is determined to be a bitrate value indicated by the downlink ANBR information, when the bitrate value indicated by the downlink ANBR information is smaller than a receiving bitrate for reception of the speech of the multimedia telephony session.

Example 109 includes the apparatus of Example 107, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the speech of the multimedia telephony session.

Example 110 includes the apparatus of Example 105 or 106, wherein the media includes video, and wherein the apparatus further includes: means for encoding a real-time transport control protocol (RTCP) temporary maximum media stream bitrate request (TMMBR) message for transmission to the remote UE based on the downlink ANBR information received from the RAN, wherein the RTCP TMMBR message is to indicate a desired receiving bitrate for reception of the video of the multimedia telephony session.

Example 111 includes the apparatus of Example 110, the desired receiving bitrate is determined to be a bitrate value indicated by the downlink ANBR information, when the bitrate value indicated by the downlink ANBR information is smaller than a receiving bitrate for reception of the video of the multimedia telephony session.

Example 112 includes the apparatus of Example 110, the desired receiving bitrate is determined to be the smallest one among a bitrate value indicated by the downlink ANBR information and a bitrate value restricted by each of other bitrate adaptation triggers for the UE, when the bitrate value indicated by the downlink ANBR information is greater than a receiving bitrate for reception of the video of the multimedia telephony session.

Example 113 includes an apparatus for a user equipment (UE) operable to stream media of a multimedia telephony session with a remote UE, the apparatus comprising: means for encoding a message including radio capability information of the UE; and means for transmitting the message to the remote UE.

Example 114 includes the apparatus of Example 113, wherein the message includes an application layer message.

Example 115 includes the apparatus of Example 114, wherein the application layer message includes: a real-time transport control protocol (RTCP) feedback message; or a real-time transport protocol (RTP) header extension message.

Example 116 includes the apparatus of Example 113, wherein the message includes a session description protocol (SDP) message during an internet protocol (IP) multimedia subsystem (IMS)/session initiation protocol (SIP) based capability negotiation, wherein the SDP message includes: a dedicated SDP parameter on a real-time transport control protocol (RTCP) based ability; or a dedicated SDP parameter on a real-time transport protocol (RTP) based ability.

Example 117 includes the apparatus of any of Examples 113 to 116, wherein the radio capability information includes information for delay budget reporting capability to indicate support of delay budget reporting by the UE and support of reception of delay budget report by a radio access network (RAN) to which the UE is connected.

Example 118 includes the apparatus of any of Examples 113 to 116, wherein the radio capability information includes information for access network bitrate recommendation (ANBR) signaling capability to indicate support of reception of ANBR information by the UE from a radio access network (RAN) to which the UE is connected and support of transmission of the ANBR information from the RAN to the UE.

Example 119 includes the apparatus of Example 118, wherein the ANBR information includes uplink ANBR information for the UE and downlink ANBR information for the UE.

Example 120 includes the apparatus of any of Examples 117 to 119, wherein the RAN includes an access node, and wherein the access node includes an enhanced NodeB (eNB) or a next generation NodeB (gNB).

Example 121. One or more computer-readable media having instructions stored thereon, the instructions when executed by processor circuitry cause the processor circuitry to perform the method of any one of Examples 41 to 80.

Example 122 includes a user equipment (UE) as shown and described in the description.

Example 123 includes an access node as shown and described in the description.

Example 124 includes a method performed at a user equipment (UE) as shown and described in the description.

Example 125 includes a method performed at an access node as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. A method comprising:

receiving, at a user equipment (UE), a session description protocol (SDP) offer message from a remote UE for a multimedia telephony session;

determining, based on a value of an SDP attribute parameter included in the SDP offer message, support of delay budget reporting capability of the remote UE, wherein the delay budget reporting capability of the remote UE corresponds to an ability of the remote UE to receive delay budget reports;

in response to determining support of delay budget reporting capability by the remote UE, encoding an SDP answer message to the remote UE, wherein the encoding comprises including a value of an SDP attribute parameter in the SDP answer message indicating support of delay budget reporting capability of the UE, wherein the delay budget reporting capability of the UE corresponds to an ability of the UE to receive delay budget reports; and causing transmission of the SDP answer message to the remote UE.

2. The method of claim 1, wherein the SDP offer message comprises a real-time transport protocol (RTP) header extension message indicating radio capability information of the remote UE.

3. The method of claim 2, wherein the SDP attribute parameter corresponds to a Boolean parameter in the RTP header extension message indicating delay budget reporting capability.

4. The method of claim 1, wherein the SDP answer message comprises a real-time transport control protocol (RTCP) feedback message indicating radio capability information of the UE.

5. The method of claim 1, wherein the SDP attribute parameter comprises a "a=rtcp-fb" attribute.

6. The method of claim 1, wherein delay budget reporting capability of the remote UE corresponds to an ability of at least one of the remote UE or a remote base station to which the remote UE is connected to receive delay budget reports, and wherein the delay budget reporting capability of the UE corresponds to an ability of at least one of the UE or a base station to which the UE is connected to receive delay budget reports.

7. A method comprising:

receiving, by a user equipment (UE), a session description protocol (SDP) offer message from a remote UE for a multimedia telephony session, wherein the SDP offer message includes a first SDP attribute parameter indicating support of access network bitrate recommendation (ANBR) capability of the remote UE, wherein the ANBR capability of the remote UE corresponds to an ability of the remote UE to receive ANBR information from a remote radio access network (RAN) to which the remote UE is connected;

causing transmission of an SDP answer message to the remote UE in response to the SDP offer message, wherein the SDP answer message includes a second SDP attribute parameter indicating support of ANBR capability of the UE, wherein the ANBR capability of the UE corresponds to an ability of the UE to receive ANBR information from a RAN to which the UE is connected; and causing transmission of a real-time transport control protocol (RTCP) temporary maximum media stream bitrate request (TMMBR) message for transmission to the remote UE, wherein the RTCP TMMBR message is distinct from the SDP answer message and indicates a desired receiving bitrate for reception of media of the multimedia telephony session.

8. The method of claim 7, wherein the second SDP attribute parameter further indicates support of RAN-assisted codec adaptation of the UE, and the first SDP attribute parameter further indicates support of RAN-assisted codec adaptation of the remote UE, and wherein RAN-assisted codec adaptation of the UE is performed by the UE based on the ANBR information received by the UE from the RAN, and RAN-assisted codec adaptation of the remote UE is performed by the remote UE based on the ANBR information received by the remote UE from the remote RAN.

9. The method of claim 8, wherein the ANBR information received by the UE from the RAN is downlink ANBR information, the media includes speech, the method comprising:

encoding a codec mode request (CMR)/real-time transport control protocol (RTCP)-application (RTCP-APP) message for transmission to the remote UE based on the downlink ANBR information received from the RAN, wherein the CMR/RTCP-APP message indicates a desired receiving bitrate for reception of the speech of the multimedia telephony session.

10. The method of claim 9, wherein the desired receiving bitrate is determined to be a bitrate value indicated by the downlink ANBR information, when the bitrate value indicated by the downlink ANBR information is smaller than a receiving bitrate for reception of the speech of the multimedia telephony session.

11. The method of claim 7, wherein the ANBR information received by the UE from the RAN is downlink ANBR information, and wherein the desired receiving bitrate is determined to be a bitrate value indicated by the downlink ANBR information when the bitrate value indicated by the downlink ANBR information is smaller than a receiving bitrate for reception of the media of the multimedia telephony session.

12. One or more non-transitory computer-readable media storing instructions that, when executed by processor circuitry of a user equipment (UE), cause the processor circuitry to perform operations comprising:

receiving, at the UE, a session description protocol (SDP) offer message from a remote UE for a multimedia telephony session;

determining, based on a value of an SDP attribute parameter included in the SDP offer message, support of delay budget reporting capability of the remote UE, wherein the delay budget reporting capability of the remote UE corresponds to an ability of the remote UE to receive delay budget reports;

in response to determining support of delay budget reporting capability by the remote UE, encoding an SDP answer message to the remote UE, wherein the encoding comprises including a value of an SDP attribute parameter in the SDP answer message indicating support of delay budget reporting capability of the UE, wherein the delay budget reporting capability of the UE corresponds to an ability of the UE to receive delay budget reports; and causing transmission of the SDP answer message to the remote UE.

13. The one or more non-transitory computer-readable media of claim 12, wherein the SDP offer message comprises a real-time transport protocol (RTP) header extension message indicating radio capability information of the remote UE.

14. The one or more non-transitory computer-readable media of claim 13, wherein the SDP attribute parameter corresponds to a Boolean parameter in the RTP header extension message indicating delay budget reporting capability.

15. The one or more non-transitory computer-readable media of claim 12, wherein the SDP answer message comprises a real-time transport control protocol (RTCP) feedback message indicating radio capability information of the UE.

16. The one or more non-transitory computer-readable media of claim 12, wherein the SDP attribute parameter comprises a "a=rtcp-fb" attribute.

17. The one or more non-transitory computer-readable media of claim 12, wherein delay budget reporting capability of the remote UE corresponds to an ability of at least one of the remote UE or a remote base station to which the remote UE is connected to receive delay budget reports, and wherein the delay budget reporting capability of the UE corresponds to an ability of at least one of the UE or a base station to which the UE is connected to receive delay budget reports.

* * * * *